(12) United States Patent
Onojima

(10) Patent No.: US 7,663,736 B2
(45) Date of Patent: Feb. 16, 2010

(54) LASER RADAR DRIVING APPARATUS

(75) Inventor: Noboru Onojima, Saitama (JP)

(73) Assignee: Sanyo Electric Co., Ltd., Osaka (JP)

( * ) Notice: Subject to any disclaimer, the term of this patent is extended or adjusted under 35 U.S.C. 154(b) by 169 days.

(21) Appl. No.: 11/852,871

(22) Filed: Sep. 10, 2007

(65) Prior Publication Data

US 2008/0252873 A1 Oct. 16, 2008

(30) Foreign Application Priority Data

Apr. 10, 2007 (JP) ............................. 2007-103177
Apr. 26, 2007 (JP) ............................. 2007-116436

(51) Int. Cl.
*G01C 3/08* (2006.01)
(52) U.S. Cl. .................................................. 356/5.01
(58) Field of Classification Search ....... 356/3.01–3.15, 356/4.01–4.1, 5.01–5.15, 6–22
See application file for complete search history.

(56) References Cited

U.S. PATENT DOCUMENTS 7,030,968 B2 * 4/2006 D'Aligny et al. ........... 356/5.01
2005/0168720 A1 * 8/2005 Yamashita et al. .......... 356/4.01
2005/0254044 A1 * 11/2005 Sugiura et al. ............ 356/141.1

FOREIGN PATENT DOCUMENTS

JP 2005-181114 7/2005

* cited by examiner

*Primary Examiner*—Thomas H Tarcza
*Assistant Examiner*—Luke D Ratcliffe
(74) *Attorney, Agent, or Firm*—Fish & Richardson P.C.

(57) ABSTRACT

A laser radar driving apparatus applying a laser beam to a target object and detecting the laser beam reflected and returned from the target object to measure a distance to the target object, at least comprising: an optical member that the laser beam is applied to; a main body member that the optical member is mounted to; and a coil capable of manipulating the main body member, a drive assembly being configured with mounting the optical member and the coil to the main body member.

15 Claims, 7 Drawing Sheets

LASER RADAR DRIVING APPARATUS

CROSS-REFERENCE TO RELATED APPLICATIONS

This application claims the benefit of priority to Japanese Patent Application Nos. 2007-103177 and 2007-116436, filed Apr. 10, 2007 and Apr. 26, 2007, respectively, of which full contents are incorporated herein by reference.

BACKGROUND OF THE INVENTION

1. Field of the Invention

The present invention relates to a laser radar driving apparatus provided for laser radar mounted, for example, on automobiles to measure a distance to a target object.

2. Description of the Related Art

Laser radar is considered to oscillate laser beams and detect the laser beams to measure a direction of and a distance to a target object, for example. Laser is an abbreviation of "light amplification by stimulated emission of radiation". A conventional technology related to the laser radar is shown in, for example, preceding vehicle detection device and control method thereof that detects a preceding vehicle ahead of the own vehicle with the use of a scanning laser radar (see, e.g., Japanese Patent Application Laid-Open Publication No. 2005-181114 (page 3, FIGS. 1 to 10)).

Laser radar driving apparatuses include, for example, a laser radar driving apparatus that has a movable unit including a lens, which allows a laser beam to pass therethrough, moved in the lateral direction or longitudinal direction, which is a so-called lens shift type laser radar driving apparatus (not shown).

Another laser radar driving apparatus has conceived as a laser radar driving apparatus, for example, having a movable unit that includes an optical member to which a laser beam is applied and that is driven with being supported by a plurality of suspension wires, which is a so-called suspension support type laser radar driving apparatus (not shown).

Recently, it has been requested in the market to further improve response characteristics such as angular acceleration sensitivity in the lens shift type laser radar driving apparatuses and the suspension support type laser radar driving apparatuses.

It has been also requested in the market to lower the prices of the lens shift type laser radar driving apparatuses and the suspension support type laser radar driving apparatuses.

Therefore, for example, a suspension support type laser radar driving apparatus is conceived, which has a price lowered by omitting a servo drive control function. A servo or servo mechanism means a mechanism measuring a state of an object to be controlled and comparing the measurement result with a reference value to cause correction control to be automatically executed.

However, in laser radar driving apparatuses using the above conventional movable unit support system as the suspension support system, if the servo was not used for the drive control, it has been difficult to execute the accurate drive control of the movable unit and to achieve improvement in the response characteristics.

SUMMARY OF THE INVENTION

A laser radar driving apparatus according to an aspect of the present invention, which applies a laser beam to a target object and detects the laser beam reflected and returned from the target object to measure a distance to the target object, at least comprises: an optical member that the laser beam is applied to; a main body member that the optical member is mounted to; and a coil capable of manipulating the main body member, a drive assembly being configured with mounting the optical member and the coil to the main body member.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

One embodiment of a laser radar driving apparatus according to the present invention will hereinafter be described with reference to the drawings.

Figure 1:
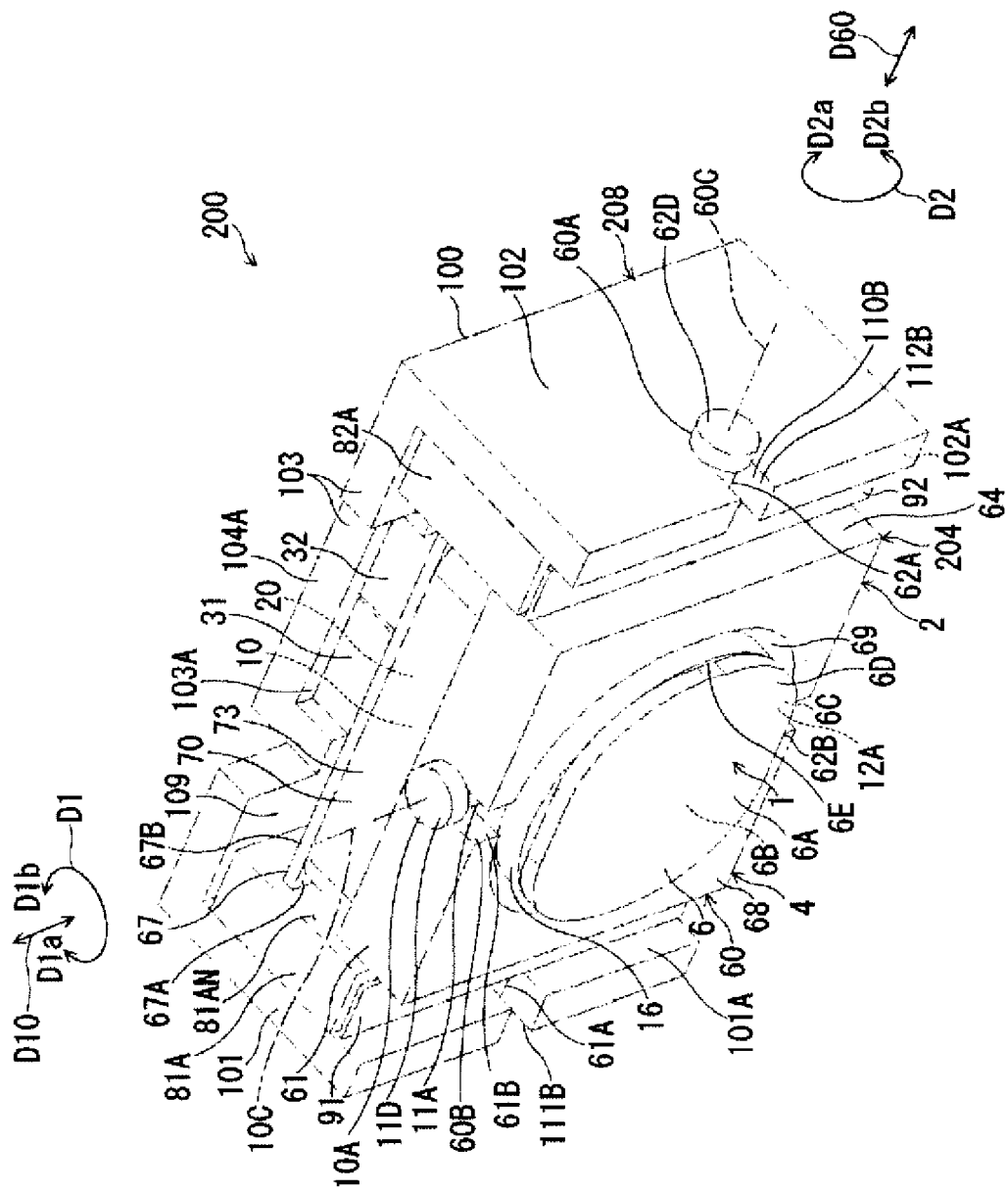
FIG. 1 is a perspective view of a laser radar driving apparatus according to one embodiment of the present invention.
Figure 5:
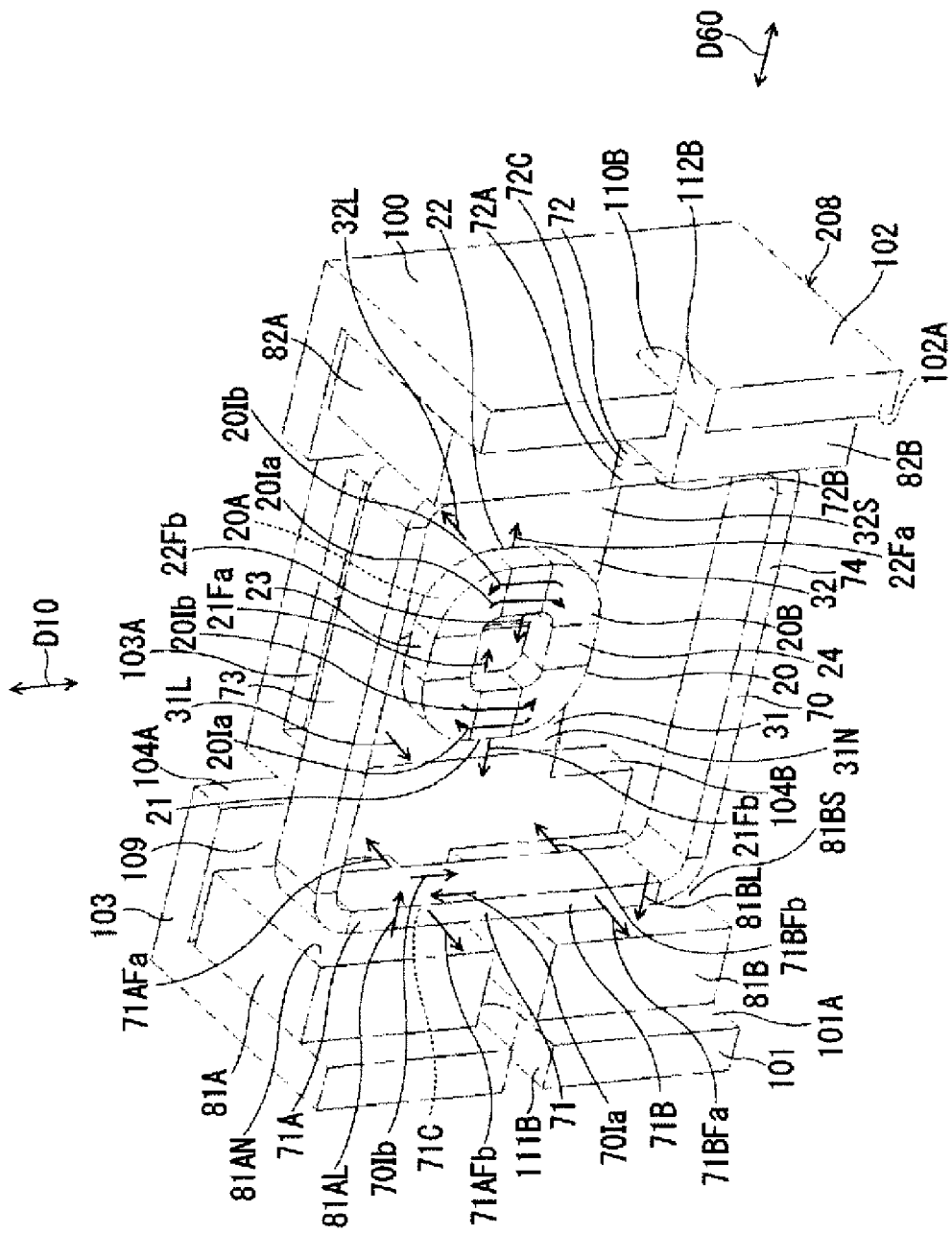
FIG. 5 is a perspective view of a frame yoke, a coil, and a magnetic member of a laser radar driving apparatus according to one embodiment of the present invention.
Figure 6:
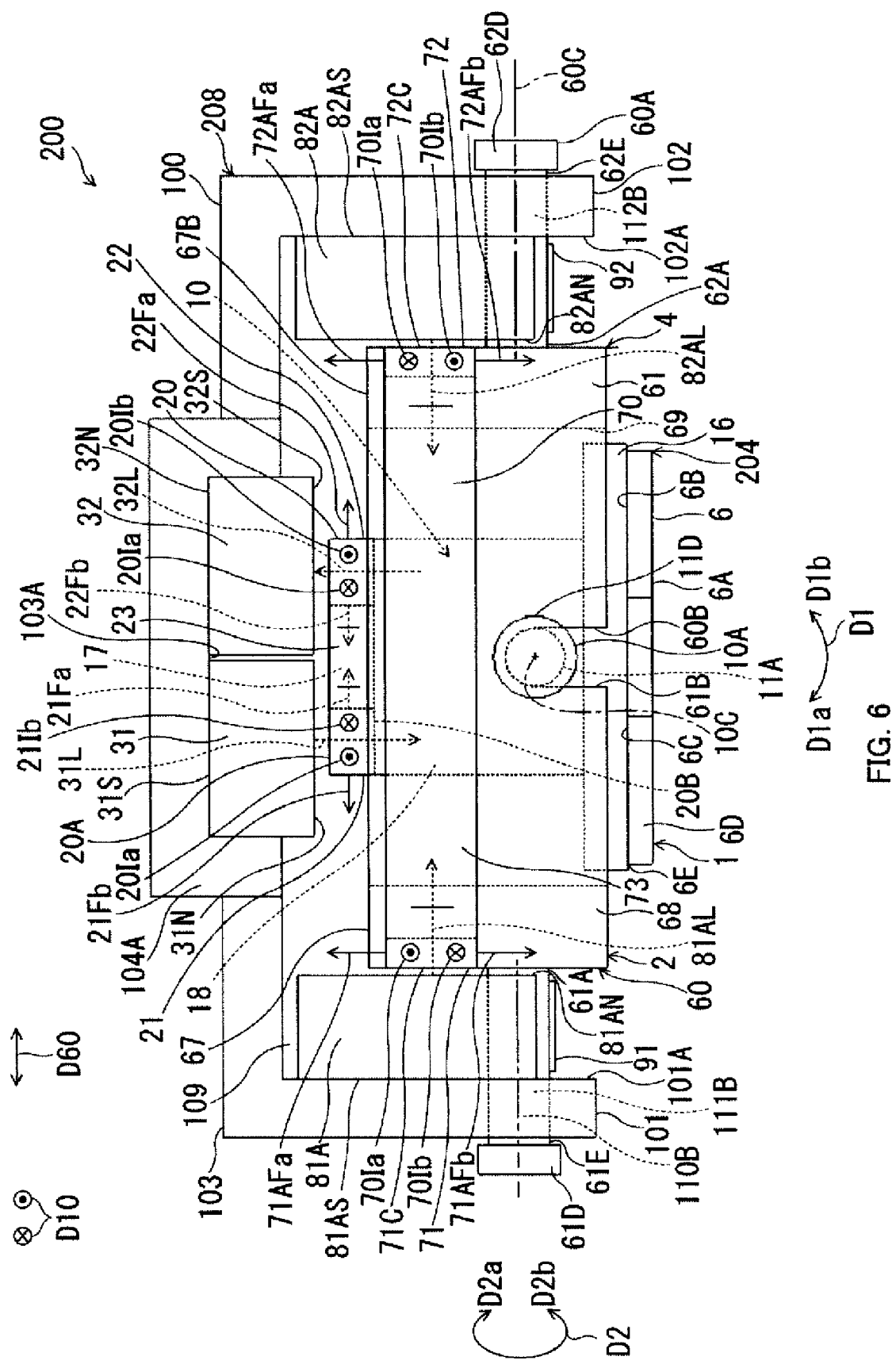
FIG. 6 is a plan view of a laser radar driving apparatus according to one embodiment of the present invention.
Figure 7:
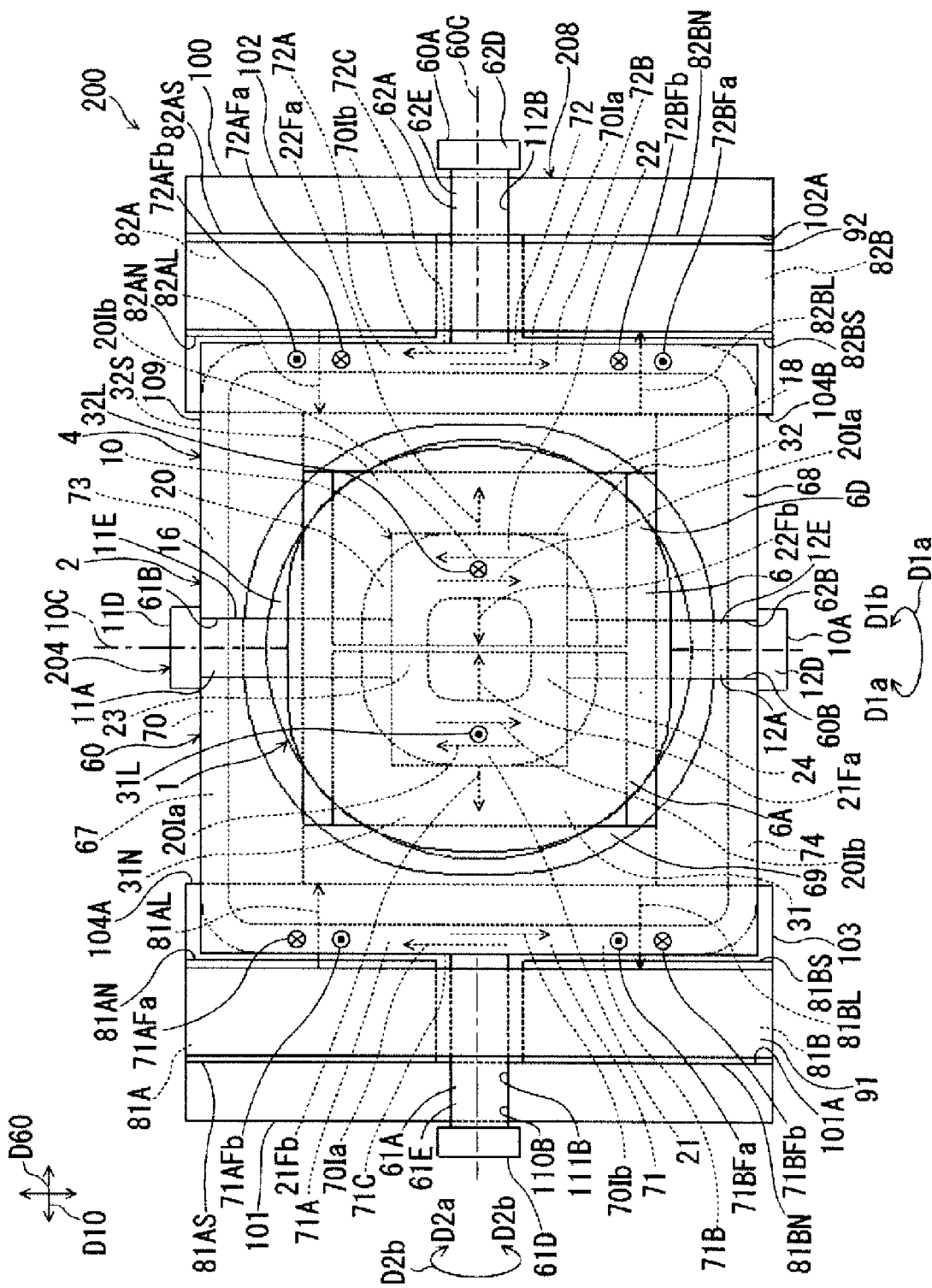
FIG. 7 is a front view of a laser radar driving apparatus according to one embodiment of the present invention.

Describing directions of a laser radar driving apparatus 200, as shown in FIG. 7, when the laser radar driving apparatus 200 is viewed from the front, the side of a first shaft portion 11A of a first-direction drive turning shaft 10A included in a first-direction drive assembly 1 is defined as the upper side, and the side of a second shaft portion 12A of the first-direction drive turning shaft 10A included in the first-direction drive assembly 1 is defined as the lower side. The side of a first shaft portion 61A of a second-direction drive turning shaft 60A included in a second-direction drive assembly 2 is defined as the left side, and the side of a second shaft portion 62A of the second-direction drive turning shaft 60A included in the second-direction drive assembly 2 is defined as the right side. As shown in FIGS. 1, 6, and 7, the side of a surface portion 6A of an optical member 6 included in the laser radar driving apparatus 200 is defined as the front side or the near side, and as shown in FIGS. 1, 5, and 6, the side of a third sidewall portion 103 of the frame yoke 100 included in the laser radar driving apparatus 200 is defined as the back side or the far side.

Figure 2:
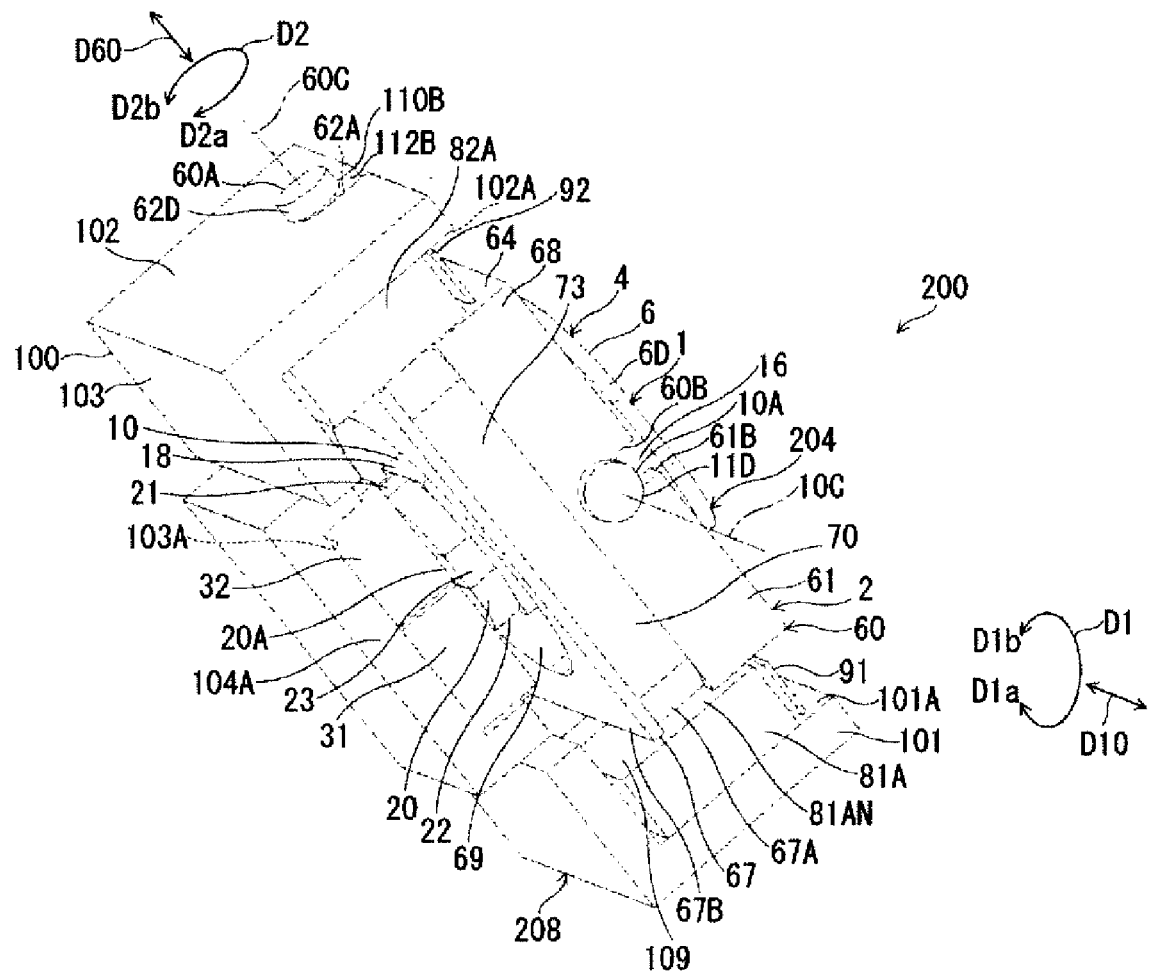
FIG. 2 is another perspective view of a laser radar driving apparatus according to one embodiment of the present invention.
Figure 3:
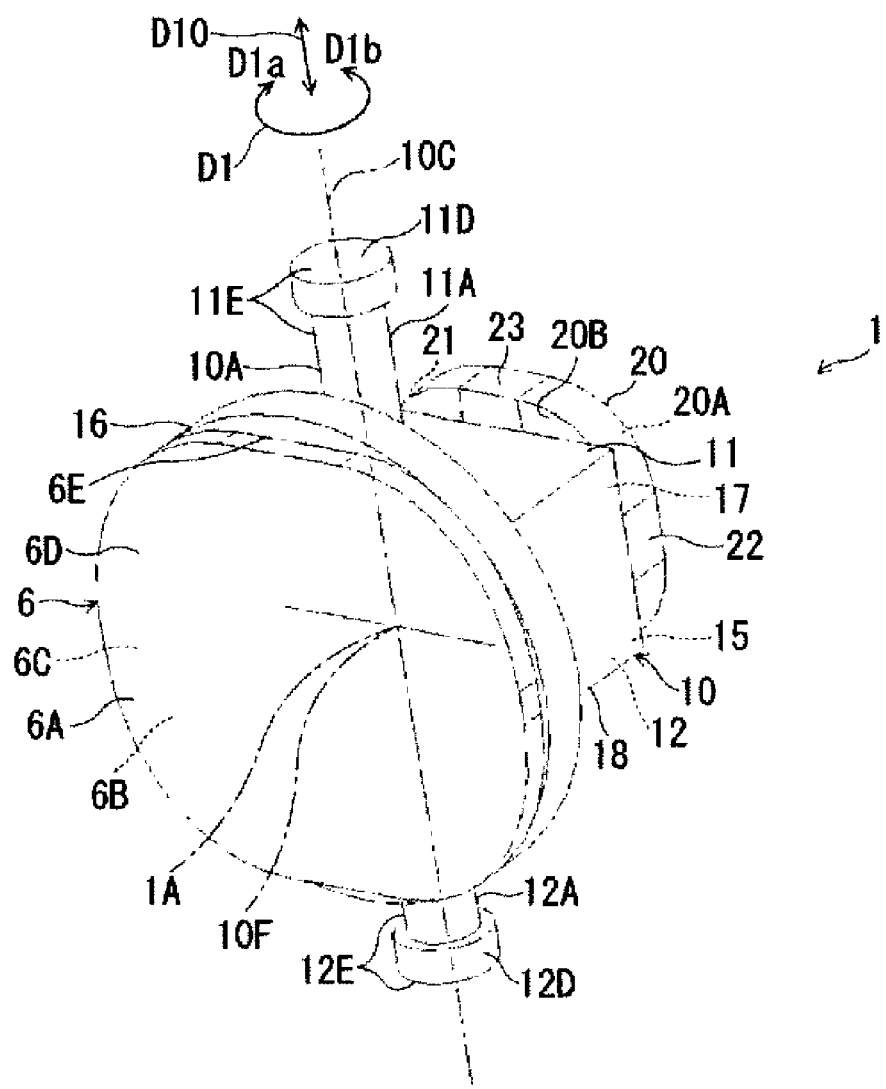
FIG. 3 is a perspective view of a first-direction drive assembly of a laser radar driving apparatus according to one embodiment of the present invention.
Figure 4:
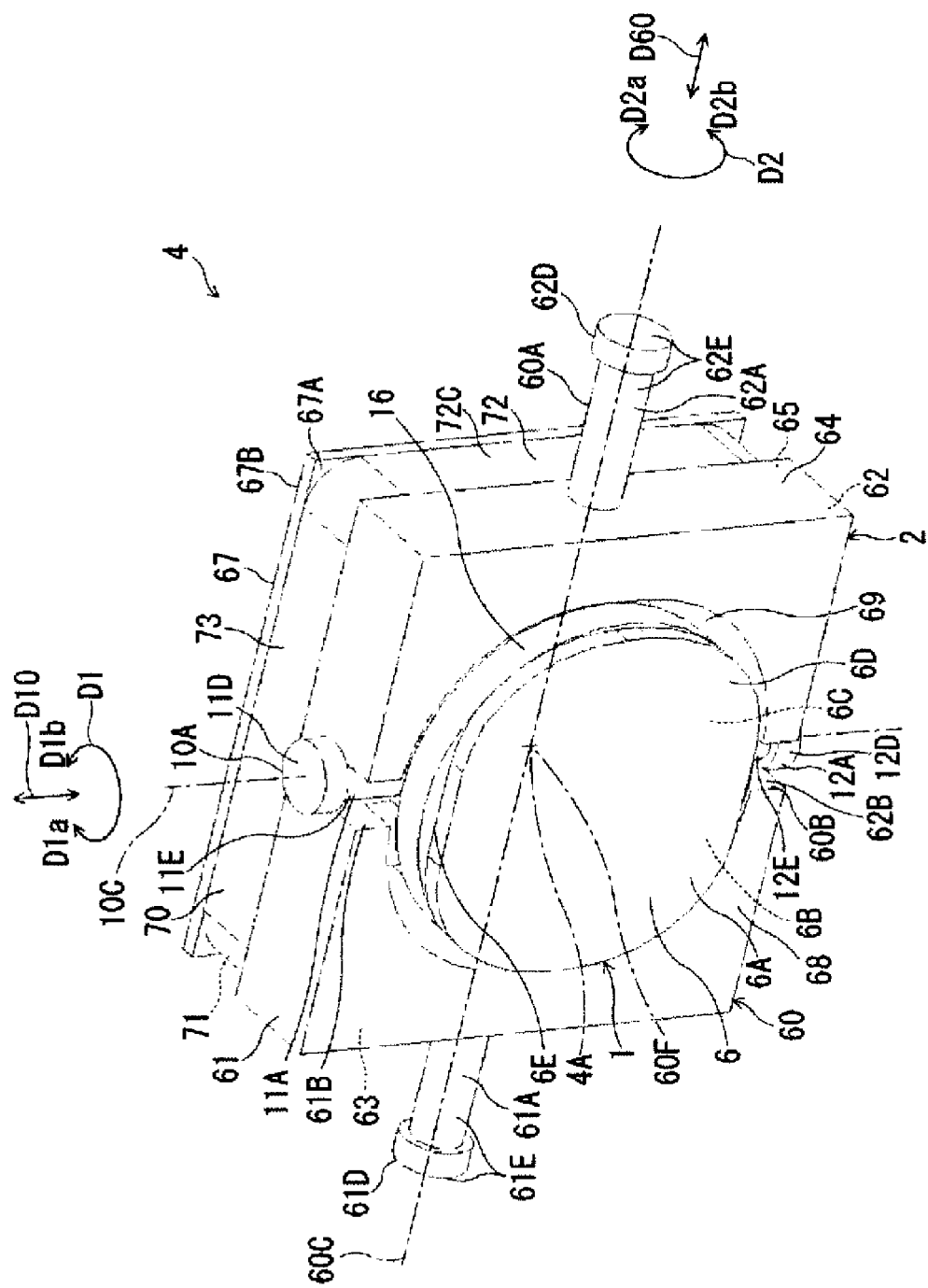
FIG. 4 is a perspective view of a two-direction drive assembly of a laser radar driving apparatus according to one embodiment of the present invention.

As shown in FIGS. 1 to 4, a first direction D1 is defined as a lateral turn direction D1 including a left turn direction D1a and a right turn direction D1b. The lateral turn direction D1 in the laser radar driving apparatus 200 is referred to as a pan direction D1, for example. As shown in FIGS. 1, 2, and 4, a second direction D2 is defined as a longitudinal turn direction D2 including an upward turn direction D2a and a downward turn direction D2b. The longitudinal turn direction D2 in the laser radar driving apparatus 200 is referred to as a tilt direction D2, for example.

"Pan" as used herein means an operation of turning and skewing the optical member 6 to the left or right, for example. "Tilt" as used herein means an operation of turning and skewing the optical member 6 upward or downward, for example.

As shown in FIGS. 3, 4, and 7, a shaft direction D10 is a longitudinal direction D10 of the first-direction drive turning shaft 10A included in the first-direction drive assembly 1. As shown in FIGS. 4, 6, and 7, a shaft direction D60 is a longitudinal direction D60 of the second-direction drive turning shaft 60A included in the second-direction drive assembly 2.

As shown in FIG. 7, when the laser radar driving apparatus 200 is viewed from the front, a current 20Ia applied to a substantially rectangle annular flat-plate first-direction drive coil 20 (FIGS. 5 and 7) is defined as a clockwise current 20Ia, and a current 20Ib applied to the substantially rectangle annular flat-plate first-direction drive coil 20 is defined as a counterclockwise current 20Ib. As shown in FIG. 7, when the laser radar driving apparatus 200 is viewed from the front, a current 70Ia applied to a substantially rectangle annular cylindrical second-direction drive coil 70 (FIGS. 5 and 7) is defined as a clockwise current 70Ia, and a current 70Ib applied to the substantially rectangle annular cylindrical second-direction drive coil 70 is defined as a counterclockwise current 70Ib. For convenience, arrows of substantially curved lines or substantially straight lines are used to show the currents 20Ia and 70Ia flowing substantially in the front-view clockwise direction. For convenience, arrows of substantially curved lines or substantially straight lines are used to show the currents 20Ib and 70Ib flowing substantially in the front-view counterclockwise direction.

The definitions of "left", "right", "upward", "downward", "front", "back", "near", "far", "clockwise", and "counterclockwise", etc., as used herein are definitions for convenience to describe the laser radar driving apparatus 200.

Although arrows of substantially straight lines, etc., are used to show magnetic force lines 31L (FIG. 5), 32L, 81AL, 81BL, 82AL (FIG. 7), and 82BL for convenience, the actual magnetic force lines 31L (FIG. 5), 32L, 81AL, 81BL, 82AL (FIG. 7), and 82BL are considered as a multiplicity of invisible curved lines (not shown). For convenience, arrows of substantially straight lines, etc., are used to show forces 21Fa, 21Fb, 22Fa, and 22Fb acting on the first-direction drive coil 20 (FIGS. 5 to 7) and forces 71AFa, 71AFb, 71BFa, 71BFb, 72AFa (FIG. 6), 72AFb, 72BFa (FIG. 7), and 72BFb acting on the second-direction drive coil 70 (FIG. 5).

The laser radar driving apparatus 200 (FIGS. 1, 2, 6, and 7) is considered to measure a distance to a target object by applying a laser beam emitted from a light-emitting element (not shown) to the target object and detecting the laser beam reflected and returned from the target object. The laser radar driving apparatus 200 is considered as the friction support type laser radar driving apparatus 200, which is the so-called galvano type laser radar driving apparatus 200.

A movable unit 204 (FIGS. 1, 6, 7) of the laser radar driving apparatus 200 includes a mirror 6 (FIG. 3), a pan main body member 10, a pair of upper and lower springs (not shown) for retaining the pan main body member 10, a pan drive coil 20 (FIG. 5), a tilt main body member 60 (FIG. 4), a pair of left and right springs 91, 92 (FIG. 1) for retaining the tilt main body member 60, and a tilt drive coil 70 (FIG. 5), for example.

A fixed unit 208 (FIG. 5) of the laser radar driving apparatus 200 (FIG. 1) includes two two-pole pan drive magnets 31, 32, four two-pole tilt drive magnets 81A, 81B, 82A, and 82B, and the frame yoke 100, for example. The pan drive coil 20 shown in FIG. 5 is mounted on a pan main body member 10 (FIG. 3). The tilt drive coil 70 shown in FIG. 5 is mounted on the tilt main body member 60 (FIG. 4). FIG. 5 is a perspective view depicted for facilitating the understanding of the relationship between the pan drive coil 20 and the pan drive magnets 31 and 32, and the relationship between the tilt drive coil 70 and the tilt drive magnets 81A, 81B, 82A, and 82B, for convenience.

For the light emitting element, there are used a laser diode (LD), etc., which can emit infrared laser beam or near-infrared laser beam having a wavelength of the order of 770 to 1200 nm, for example. Specifically, for the light emitting element, there is used LD which can emit infrared laser beam having a wavelength of the order of 770 to 830 nm, for example. It is preferable that the infrared laser beam or the near-infrared laser beam is emitted and used as pulsed light, for example.

The mirror 6, which is defined as the optical member 6 (FIG. 3), includes optical glass or plastic. Specifically, for example, a thermoplastic synthetic resin material is used for injection molding of the mirror 6.

The pan main body member 10 (FIG. 3) or the tilt main body member 60 (FIG. 4) is formed from a resin material having small slide resistance and high fatigue strength, for example. Specifically, either the an main body member 10 or the tilt main body member 60, or both the members are formed from a synthetic resin material which is: excellent in slide characteristics, such as wear resistance, and strength characteristics; excellent in heat resistance, at the time of soldering, etc.; excellent in injection-molding processability; and capable of saving more weight as compared to iron materials. The pan main body member 10 is formed such that a substantially rectangle box-shaped main body 18 (FIG. 3), a substantially round bar-shaped turning shaft 10A projected toward both the upper and lower sides out of the main body 18, a substantially circular plate-shaped member mounting unit 16 adjacent to the front side of the main body 18, and a projected-shaped coil mounting unit 17 projected from the back side of the main body 18 are integrally molded of one synthetic resin material based on an injection molding method, for example. The tilt main body member 60 is formed such that a substantially rectangle box-shaped main body 68 (FIG. 4), a substantially round bar-shaped turning shaft 60A projected toward both the left and right sides out of the main body 68, and a plate/wall-shaped coil mounting unit 67 adjacent to the main body 68 are integrally molded of one synthetic resin material based on an injection molding method, for example. The coil mounting unit 67 includes a rear surface portion 65 of the main body 68 included in the pan main body member 10, a substantially flat plate-shaped rear sidewall 67B opposed to the rear surface portion 65 of the main body 68, and a substantially rectangle groove-shaped coil housing unit 67A housing the coil 70.

The retaining members 91 and 92 (FIG. 1) are formed from a metal material which can be used as conductor. Specifically, the retaining members 91 and 92 in a substantially plate-shape, etc., are press-formed by performing a press processing such as a punching processing and a bending processing for a phosphor bronze plate material, which is excellent in strength, spring characteristics, and corrosion resistance and can be used as conductor.

Either the pan drive coil 20 (FIG. 5) or the tilt drive coil 70 (FIG. 5), or both the coils include a conducting wire with an insulating coating material. Specifically, a copper-clad aluminum wire, which can facilitate weight saving, is used, and this wire coated with insulating material such as an enamel material is used to make up either the pan drive coil 20 or the tilt drive coil 70, or both the coils. In accordance with the design/specification of the laser radar driving apparatus 200, for example, single layer winding type coil can be used for the coils 20 and 70. In accordance with the design/specification of the laser radar driving apparatus 200, for example double layer winding type coil can be used for the coils 20 and 70.

The magnetic members 31, 32 (FIGS. 1, 2, 6, and 7), 81A, 81B, 82A, and 82B (FIGS. 5 and 7) may be magnet or magnet steels, etc., for example. Specifically, the magnets 31, 32 (FIGS. 1, 2, 6, and 7), 81A, 81B, 82A, and 82B (FIGS. 5 and 7) are, for example, formed from a permanent magnet material. For example, the magnetic members 31, 32, 81A, 81B, 82A, and 82B are made of ferrite magnet, which is inexpensive, with high coercivity, and hard to be demagnetized. Alternatively, the magnets 31, 32 (FIGS. 1, 2, 6, and 7), 81A, 81B, 82A, and 82B (FIGS. 5 and 7) are, for example, formed from magnet steel. The magnet steel is alloy steel formed by adding to iron etc., for example, chromium, aluminum, nickel, cobalt, etc., and is considered to have coercivity and permanent magnet characteristics with high residual magnetic flux density due to quench hardening, deposition hardening, etc. To achieve price-reduction through the volume production efficiency, the pan drive magnets 31 and 32 are formed to be the same shape and to have the same characteristics. Similarly, to achieve price-reduction through the volume production efficiency, the tilt drive magnets 81A, 81B, 82A, and 82B are all formed to be in the same shape and to have the same characteristics. In accordance with the design/specification of the laser radar driving apparatus 200, for example, there can be used a laser radar driving apparatus that is equipped with the magnets (31, 32, 81A, 81B, 82A, and 82B) all formed to be in the same shape and to have the same characteristics to achieve price-reduction. The parentheses ( ) added to reference numerals of this description are used for describing things slightly different from the shown contents, for convenience.

The frame yoke 100 is formed from a metal material attracting magnetic materials. For example, the frame yoke 100 is formed by performing a press processing such as a punching process and a bending processing for a thin steel plate such as a rolled steel plate. The "frame" means, for example, a frame, a framework, and a skeleton. The "yoke" means, for example, a thing structurally supporting magnetic links. The "yoke" is considered to reduce leak of magnetic forces generated from the magnets. The frame yoke 100 is formed as a frame including the function of the yoke. The weight of the laser radar driving apparatus 200 including the frame yoke 100 is reduced by forming a pair of notch portions 104A (FIGS. 1 and 5) and 104B (FIG. 5) reducing the weight of the frame yoke 100 on the upper and lower side of the rear sidewall portion 103 of the frame yoke 100.

A comparative study in angular acceleration sensitivity was executed for lens shift type laser radar, a suspension support type laser radar, and friction support type laser radar.

The friction support type laser radar driving apparatus 200 (FIGS. 1, 2, 6, and 7) includes: the optical member 6 (FIGS. 1 to 4, 6, and 7) reflecting a laser beam when the laser beam is applied; the main body member 10 (FIG. 3) on which the optical member 6 is mounted; a pair of the magnets 31 and 32 (FIGS. 1, 2, and 5) capable of manipulating the main body member 10 including the optical member 6; and the coil 20 (FIG. 5), corresponding to the magnetic fields generated by the magnets 31 and 32, capable of generating the electromagnetic forces 21Fa, 22Fa or 21Fb, 22Fb when applied with the currents 20Ia or 20Ib so as to manipulate the main body member 10 to which the optical member 6 (FIG. 3) is mounted. The drive assembly 1 is configured with mounting the optical member 6 (FIG. 3) and the coil 20 to the main body member 10.

If the friction support type laser radar driving apparatus 200 is configured as above, the response characteristics of the laser radar driving apparatus 200 are easily improved. For example, when the drive assembly 1 of the friction support type laser radar driving apparatus 200 is turned, the angular acceleration is about 10 times greater in numerical value than the angular acceleration at the time of turning a drive assembly of a conventional lens shift type laser radar drive apparatus.

For example, the angular acceleration sensitivity of the pan direction D1 of the drive assembly in the lens shift type laser radar drive apparatus is $7.58 \times 10^5 [(deg/s^2)/W^{0.5}]$. On the other hand, the angular acceleration sensitivity of the pan direction D1 of the drive assembly 1 in the friction support type laser radar drive apparatus 200 is $8.65 \times 10^6 [(deg/s^2)/W^{0.5}]$.

Comparing in angular acceleration sensitivity of the pan direction D1 between the drive assembly in the lens shift type laser radar drive apparatus and the drive assembly 1 in the friction support type laser radar drive apparatus 200, the drive assembly 1 in the friction support type laser radar drive apparatus 200 is considered to be about 10 times or more greater in angular acceleration sensitivity of the pan direction D1 than the drive assembly in the lens shift type laser radar drive apparatus. The friction support type laser radar drive apparatus 200 is considered to be excellent in the angular acceleration sensitivity of the pan drive. The fundamental frequency is not affected by the angular acceleration sensitivity.

The drive assembly 1 in the friction support type laser radar drive apparatus 200 is smaller in size than the drive assembly of the conventional lens shift type laser radar drive apparatus and the drive assembly of the conventional suspension support type laser radar drive apparatus. The wobbling angle of the drive assembly 1 of the laser radar drive apparatus 200 can be set to a smaller angle.

The laser radar drive apparatus 200 is configured by the minimum number of the coils 20 and 70 without a multiplicity of coils being required, which coils 20 and 70 are more reduced in number compared to the coils in the conventional lens shift type laser radar drive apparatus and the coils in the conventional suspension support type laser radar drive apparatus. By reducing the number of parts, the price of the laser radar drive apparatus 200 can be lowered.

As shown in FIG. 3, the main body member 10 included in the drive assembly 1 includes the turning shaft 10A capable of turning the drive assembly 1. The turning shaft 10A capable of turning the drive assembly 1 is projected from the main body 18 of the main body member 10 included in the drive assembly 1. A gravity center portion 1A of the drive assembly 1 substantially coincides with a center portion 10F between both end portions 11E and 12E of the turning shaft 10A on the center axis 10C of the turning shaft 10A.

If the friction support type laser radar driving apparatus 200 is configured as above, the response characteristics of the laser radar driving apparatus 200 are improved. The drive assembly 1 configured with mounting the optical member 6 and the coil 20 on the main body member 10 includes the gravity center portion 1A. For example, the center portion 10F exists between both of the end portions 11E and 12E of the turning shaft 10A on the center axis 10C of the turning shaft 10A of the main body member 10 capable of turning the drive assembly 1. Since the gravity center portion 1A of the drive assembly 1 substantially coincides with the center portion 10F on the center axis 10C of the turning shaft 10A, the drive assembly 1 including the optical member 6, the coil 20, and the main body member 10 becomes easy to be turned smoothly around the turning shaft 10A of the main body member 1. The moment at the time of turning the drive assembly 1 of the laser radar driving apparatus 200 is easily obtained. Since the drive assembly 1 is smoothly turned, the response characteristics of the laser radar driving apparatus 200 are improved.

When the drive assembly 1 including the optical member 6 (FIG. 3), the coil 20, and the main body member 10 is turned around the turning shaft 10A (FIGS. 1 to 4, 6, and 7) disposed on the main body 18 of the main body member 10, the current 20Ia or 20Ib is applied to the coil 20 (FIGS. 5 to 7) corresponding to the magnetic fields generated by the magnets 31 and 32 (FIGS. 2 and 5) so that the electromagnetic forces 21Fa, 22Fa or 21Fb, 22Fb are generated in the coil 20. The drive assembly 1 configured with mounting the optical member 6 and the coil 20 on the main body member 10 (FIG. 3) is turned by the electromagnetic forces 21Fa, 22Fa or 21Fb, 22Fb generated in the coil 20.

The friction support type laser radar driving apparatus 200 (FIGS. 1, 2, 6, and 7) includes a pair of the magnets 31 and 32 (FIGS. 1, 2, 5 to 7), corresponding to the coil 20 (FIGS. 5 and 7), capable of driving the main body member 10 including the optical member 6 (FIG. 3) when the current 20Ia or 20Ib is applied to the coil 20. The friction support type laser radar driving apparatus 200 (FIGS. 1, 2, 6, and 7) includes the frame yoke 100 (FIGS. 5 and 6) in a substantially U-shape in a plan view including a pair of the magnets 31 and 32 (FIGS. 1, 2, 5, and 6) fixed on an inner side surface portion 103A.

As shown in FIG. 6, in a plan view of the laser radar driving apparatus 200, the frame yoke 100 is observed as a substantially U-shaped object. As shown in FIGS. 5 and 6, the frame yoke 100 is formed in a substantially U-shape in a plan view including a substantially flat-plate first sidewall portion 101, a substantially flat-plate second sidewall portion 102 substantially parallel to the first sidewall portion 101, and an irregular-shaped third sidewall portion 103 linking the first sidewall portion 101 and the second sidewall portion 102.

When the drive assembly 1 (FIG. 3) is disposed in a housing unit 109 of the frame yoke 100 (FIG. 5) in a substantially U-shape in a plan view, the coil 20 of the drive assembly 1 (FIGS. 2, 3, and 6) is substantially located (FIGS. 2, 5, and 6) within an effective magnetic field of a pair of the magnets 31 and 32 fixed to the frame yoke 100 (FIGS. 2, 5, and 6).

If the friction support type laser radar driving apparatus 200 is configured as above, the response characteristics of the laser radar driving apparatus 200 are improved. Since the coil 20 is substantially located within an effective magnetic field of a pair of the magnets 31 and 32 fixed to the frame yoke 100 when the drive assembly 1 configured with mounting the optical member 6 and the coil 20 on the main body member 10 is disposed on the housing unit 109 of the frame yoke 100 in a substantially U-shape in a plan view having a pair of the magnets 31 and 32 fixed to the inner side surface portion 103A, if the current 20Ia or 20Ib is applied to the coil 20 corresponding to the magnetic fields generated by the magnets 31 and 32, the drive assembly 1 including the optical member 6, the coil 20, and the main body member 10 is quickly turned by the electromagnetic forces 21Fa, 22Fa or 21Fb, 22Fb generated in the coil 20. Since the drive assembly 1 is quickly turned, the response characteristics of the laser radar driving apparatus 200 are improved.

The frame yoke 100 (FIG. 5) making up the laser radar driving apparatus 200 (FIGS. 1, 2, 6, and 7) includes the housing unit 109 (FIG. 5), for example, in a substantially rectangle box shape including the drive assembly 1 (FIG. 3) mounted thereon. The drive assembly 1 (FIG. 3) is rotatably disposed in the substantially rectangle box-shaped housing unit 109 of the frame yoke 100 (FIGS. 1, 2, and 6).

If the friction support type laser radar driving apparatus 200 is configured as above, the drive assembly 1 of the laser radar driving apparatus 200 is freely turned within a predetermined range of angle without other objects blocking the movement thereof in the substantially rectangle box-shaped housing unit 109 of the frame yoke 100. The drive assembly 1 disposed in the substantially rectangle box-shaped housing unit 109 of the frame yoke 100 is freely turned within a predetermined range of angle without interference from other objects.

The laser radar driving apparatus 200 (FIGS. 2 and 6) includes the substantially rectangle flat-plate magnets 31 and 32 corresponding to the coil 20 and generating magnetic fields. The coil 20 (FIG. 5) is configured as the substantially rectangle annular flat-plate coil 20 including a first surface portion 20A (FIGS. 3, 5, and 6) and a second surface portion 20B that is the opposite surface of the first surface portion 20A (FIG. 5). A pair of the substantially rectangle flat-plate magnets 31 and 32 are positioned so as to face the side of the first surface portion 20A of the substantially rectangle annular flat-plate coil 20 (FIGS. 5 and 6).

If the friction support type laser radar driving apparatus 200 is configured as above, the response characteristics of the laser radar driving apparatus 200 are improved. Since the pair of the substantially rectangle flat-plate magnets 31 and 32 are positioned on the side of the first surface portion 20A of the substantially rectangle annular flat-plate coil 20, when the current 20Ia or 20Ib is applied to the substantially rectangle annular flat-plate coil 20, the driving forces 21Fa, 22Fa or 21Fb, 22Fb are generated in the substantially rectangle annular flat-plate coil 20 due to the magnetic field generated in the pair of the substantially rectangle flat-plate magnets 31 and 32. The current 20Ia or 20Ib is applied to the substantially rectangle annular flat-plate coil 20 faced with the pair of the substantially rectangle flat-plate magnets 31 and 32 generating magnetic fields, and the drive assembly 1 including the substantially rectangle annular flat-plate coil 20 is turned by magnetic fields generated in the substantially rectangle annular flat-plate coil 20 on this occasion.

As described above, the laser radar driving apparatus 200 (FIGS. 2 and 6) includes a plurality of the magnets 31 and 32 corresponding to the coil 20. A plurality of the magnets 31 and 32 is disposed on the inner side surface portion 103A of the frame yoke 100 for the one coil 20. Specifically, for the one coil 20, the two magnets 31 and 32 are disposed on the rear center inner side surface portion 103A of the frame yoke 100. The first magnet 31 (FIG. 6) is formed in a substantially rectangle flat-plate shape including a substantially flat N pole portion 31N and a substantially flat S pole portion 31S that is the opposite pole portion of the N pole portion 31N (FIGS. 5 to 7). The second magnet 32 (FIG. 6) is formed in a substantially rectangle flat-plate shape including a substantially flat N pole portion 32N and a substantially flat S pole portion 32S that is the opposite pole portion of the N pole portion 32N (FIG. 5 to 7). The coil 20 (FIG. 5) is formed as the substantially rectangle annular flat-plate coil 20 including: a substantially flat first side portion 21 corresponding to the substantially flat N pole portion 31N of the first magnet 31; a substantially flat second side portion 22, which is the opposite side portion of the first side portion 21, corresponding to the substantially flat S pole portion 32S of the second magnet 32; a substantially flat third side portion 23 substantially orthogonal to the substantially flat first side portion 21 or the substantially flat second side portion 22; and a substantially flat fourth side portion 24, which is the opposite side portion of the third side portion 23, substantially orthogonal to the substantially flat first side portion 21 or the substantially flat second side portion 22. The substantially flat N pole portion 31N of the first magnet 31 is faced with the substantially flat first side portion 21 of the substantially rectangle annular flat-plate coil 20. The substantially flat S pole portion 32S of the second magnet 32 is faced with the substantially flat second side portion 22 of the substantially rectangle annular flat-plate coil 20.

If the friction support type laser radar driving apparatus 200 is configured as above, the response characteristics of the laser radar driving apparatus 200 are further improved. Since the substantially flat N pole portion 31N of the first magnet 31 is faced with the substantially flat first side portion 21 of the substantially rectangle annular flat-plate coil 20, when the current 20Ia or 20Ib is applied to the substantially flat first side portion 21 of the substantially rectangle annular flat-plate coil 20, the driving force 21Fa or 21Fb is generated in the substantially flat first side portion 21 of the substantially rectangle annular flat-plate coil 20 due to the magnetic field generated in the substantially flat N pole portion 31N of the first magnet 31. Since the substantially flat S pole portion 32S of the second magnet 32 is faced with the substantially flat second side portion 22 of the substantially rectangle annular flat-plate coil 20, when the current 20Ia or 20Ib is applied to the substantially flat second side portion 22 of the substantially rectangle annular flat-plate coil 20, the driving force 22Fa or 22Fb is generated in the substantially flat second side portion 22 of the substantially rectangle annular flat-plate coil 20 due to the magnetic field generated in the substantially flat S pole portion 32S of the second magnet 32.

The current 20Ia is applied to the substantially flat first side portion 21 of the substantially rectangle annular flat-plate coil 20 faced with the substantially flat N pole portion 31N of the first magnet 31 generating the magnetic field and the current 20Ia is applied to the substantially flat second side portion 22 of the substantially rectangle annular flat-plate coil 20 faced with the substantially flat S pole portion 32S of the second magnet 32 generating the magnetic field, and, on this occasion, since the driving force 21Fa resulting from the magnetic field generated in the substantially flat first side portion 21 of the substantially rectangle annular flat-plate coil 20 is combined with the driving force 22Fa resulting from the magnetic field generated in the substantially flat second side portion 22 of the substantially rectangle annular flat-plate coil 20, the drive assembly 1 (FIG. 6) including the substantially rectangle annular flat-plate coil 20 is smoothly turned around the turning shaft 10A of the drive assembly 1 substantially in the left turn direction D1a.

The current 20Ib is applied to the substantially flat first side portion 21 of the substantially rectangle annular flat-plate coil 20 faced with the substantially flat N pole portion 31N of the first magnet 31 (FIG. 5) generating the magnetic field and the current 20Ib is applied to the substantially flat second side portion 22 of the substantially rectangle annular flat-plate coil 20 faced with the substantially flat S pole portion 32S of the second magnet 32 generating the magnetic field, and, on this occasion, since the driving force 21Fb resulting from the magnetic field generated in the substantially flat first side portion 21 of the substantially rectangle annular flat-plate coil 20 is combined with the driving force 22Fb resulting from the magnetic field generated in the substantially flat second side portion 22 of the substantially rectangle annular flat-plate coil 20, the drive assembly 1 (FIG. 6) including the substantially rectangle annular flat-plate coil 20 is smoothly turned around the turning shaft 10A of the drive assembly 1 substantially in the right In accordance with the design/specification of the laser radar driving apparatus 200, for example, another form of a magnetic member such as magnet (not shown) may be used. For example, in order to reduce the number of parts of the laser radar driving apparatus 200 to bring down the price thereof, for example, there may be used one two-pole pan-direction drive magnet (not shown), which has a positive pole portion formed on one side of one surface and a negative pole portion formed on the other side of one surface, instead of the two two-pole pan-direction drive magnets 31, 32 (FIGS. 1, 2, 6, and 7). In accordance with the design/specification of the laser radar driving apparatus 200, for example, a multipolar magnetization magnet having more than two magnetized pole may be used as the magnetic member.

When the drive assembly 1 (FIG. 3) making up the laser radar driving apparatus 200 (FIGS. 1, 2, 6, and 7) is viewed from the front (FIG. 7), the drive assembly 1 is substantially laterally symmetrically configured (FIGS. 3, 6, and 7).

Therefore, the drive assembly 1 is turned, for example, substantially in the lateral turn direction D1 in a well-balanced manner. For example, in the laser radar driving apparatus 200 where the laser beam drive characteristics in the lateral turn direction D1 is regarded as important, it is determined that a laser radar driving apparatus having excellent laser beam drive characteristics in the lateral turn direction D1 has higher performance than one having excellent laser beam drive characteristics in the longitudinal turn direction D2. Since the drive assembly 1 is substantially laterally symmetrically configured, for example, when the drive assembly 1 is moved substantially in the lateral turn direction D1, the drive assembly 1 is turned in substantially the same smooth manner, in either of the left turn direction D1a or the right turn direction D1b.

The drive assembly 1 of the laser radar driving apparatus 200 is moved around the turning shaft 10A of the main body member 10 substantially in the pan direction D1 defined as the lateral turn direction D1. The drive assembly 1 of the friction support type laser radar driving apparatus 200 is quickly moved around the turning shaft 10A of the main body member 10 substantially in the pan direction D1 defined as the lateral turn direction D1.

When the mirror 6, i.e., the optical member 6 of the laser radar driving apparatus 200 is tilted toward left or right, that is, when the mirror 6, i.e., the optical member 6 of the laser radar driving apparatus 200 is driven to pan, the sensitivity of the friction support type laser radar driving apparatus 200 is considered to be the highest.

For example, comparing in the angular acceleration sensitivity among the lens shift type laser radar driving apparatus, the suspension support type laser radar driving apparatus, and the friction support type laser radar driving apparatus 200 when the same electric power is supplied thereto, the highest angular acceleration sensitivity can be obtained from the friction support type laser radar driving apparatus 200.

The friction support type laser radar driving apparatus 200 is mounted on, for example, an automobile and is used when measuring a distance to the target object by applying a laser beam from the automobile to the target object and detecting the laser beam reflected from the target object.

Specifically, the friction support type laser radar driving apparatus 200 is mounted on, for example, either the front side part or the back side part, or both the parts of an automobile (not shown), and detects an intended object or target object, for example, within about 500 m from the laser radar driving apparatus 200. The aspect ratio of the range is considered to be about 8:1. The friction support type laser radar driving apparatus 200 detects objects, in the range with a ratio of length to width of 1:8, at the location about 500 m away from a scan lens (not shown) mounted on the laser radar driving apparatus 200, for example. In accordance with the design/specification of the friction support type laser radar driving apparatus 200, for example, the laser radar driving apparatus 200 is also usable, which can detect an intended object or target object, for example, within a rage of about 100 m or, specifically, about 70 m from the scan lens not shown mounted on the laser radar driving apparatus 200. In such a friction support type laser radar driving apparatus 200 detects objects, within a range of substantially two tatami mats, at the location 70 m away from the scan lens not shown mounted on the laser radar driving apparatus 200, for example. The aspect ratio of the range is considered to be about 2:1. Such a friction support type laser radar driving apparatus 200 detects objects, in the range with a ratio of length to width of 1:2, at the location about 70 m away from the scan lens.

This friction support type laser radar driving apparatus 200 (FIGS. 1, 2, 6, and 7) comprises: the one optical member 6 (FIGS. 1 to 4, 6, and 7) to which a laser beam is applied; the one small first-direction drive main body member 10 (FIG. 3) on which the optical member 6 is mounted; a plurality of the first-direction drive magnets 31 and 32 (FIGS. 1, 2, and 5 to 7) capable of manipulating the first-direction drive main body member 10 including the optical member 6 substantial in the first direction D1; the substantially rectangle annular one small first-direction drive coil 20 (FIG. 5) capable of generating the electromagnetic forces 21Fa, 22Fa or 21Fb, 22Fb by applying the current 20Ia or 20Ib corresponding to the magnetic fields generated by the first-direction drive magnets 31 and 32 and manipulating the first-direction drive main body member 10 including the optical member 6 substantially in the first direction D1; the one large second-direction drive main body member 60 (FIG. 4) including the one small first-direction drive main body member 10 (FIG. 3) rotatably mounted thereto; a plurality of the second-direction drive magnets 81A, 81B, 82A, and 82B (FIGS. 5 and 7) capable of manipulating substantially in the second direction D2 the second-direction drive main body member 60 including the first-direction drive main body member 10 with the optical member 6 rotatably mounted thereto; and the one substantially rectangle annular large second-direction drive coil 70 (FIG. 5) capable of generating the electromagnetic forces 71AFa, 71BFa, 72AFa, 72BFa, or 71AFb, 71BFb, 72AFb, and 72BFb by applying the current 70Ia or 70Ib corresponding to the magnetic fields generated by the second-direction drive magnets 81A, 81B, 82A, and 82B and manipulating substantially in the second direction D2 the second-direction drive main body member 60 including the first-direction drive main body member 10 with the optical member 6 (FIGS. 1 and 4).

The one small first-direction drive assembly 1 is configured with mounting the one optical member 6 (FIG. 3) and the one small first-direction drive coil 20 on the one small first-direction drive main body member 10. The first-direction drive coil 20 (FIGS. 3 and 5) wounded and formed in advance is preliminarily latched to the coil mounting unit 17 (FIG. 6) of the first-direction drive main body member 10. Alternatively, for example, a thermosetting adhesive (not shown) having excellent adhesiveness such as epoxy resin is used to fix the first-direction drive coil 20 onto a back side surface portion 15 of the main body 18 of the first-direction drive main body member 10 (FIG. 3). The one large second-direction drive assembly 2 is configured with mounting the one large second-direction drive coil 70 (FIG. 4) on the one large second-direction drive main body member 60. The second-direction drive coil 70 is wounded and disposed on the groove and plate/wall-shape coil mounting unit 67 formed in the second-direction drive main body member 60. The one small first-direction drive assembly 1 is rotatably assembled to the one large second-direction drive assembly 2. Since the one first-direction drive assembly 1 lighter in weight and smaller in size than the second-direction drive assembly 2 is rotatably assembled to the one large second-direction drive assembly 2 that is comparatively lightweight, a comparatively lightweight two-direction drive assembly 4 is configured.

If the laser radar driving apparatus 200 is configured as above, the response characteristics of the laser radar driving apparatus 200 are easily improved. Since the one small first-direction drive assembly 1 including the one optical member 6, the one small first-direction drive main body member 10, and the one small first-direction drive coil 20 in a substantially rectangle annular shape is rotatably assembled to the one second-direction drive assembly 2 including the one large second-direction drive main body member 60 and the one large second-direction drive coil 70 in a substantially rectangle annular shape, the small first-direction drive assembly 1 is easily turned relative to the large second-direction drive assembly 2. Since the first-direction drive assembly 1 is smaller in size and lighter in weight than the second-direction drive assembly 2, the first-direction drive assembly 1 is easily moved relative to the second-direction drive assembly 2. Since the small first-direction drive assembly 1 rotatable substantially in the first direction D1 is assembled to the large second-direction drive assembly 2 rotatable substantially in the second direction D2, the turning ability of the first-direction drive assembly 1 relative to the second-direction drive assembly 2 is improved. Therefore, the friction support type laser radar driving apparatus 200 can be provided, which has the improved response characteristics when the first-direction drive assembly 1 is turned substantially in the first direction D1.

The first-direction drive main body member 10 making up the first-direction drive assembly 1 (FIG. 3) includes a substantially rectangle box-shaped space therein (not shown). The substantially rectangle box-shaped space not shown is disposed in the substantially rectangle box-shaped main body 18 of the first-direction drive main body member 10 making up the first-direction drive assembly 1.

Since the substantially rectangle box-shaped space not shown is disposed in the substantially rectangle box-shaped main body 18 of the first-direction drive main body member 10, the first-direction drive main body member 10 making up the first-direction drive assembly 1 can be reduced in weight. Since the first-direction drive main body member 10 making up the first-direction drive assembly 1 is reduced in weight, the turning characteristics of the first-direction drive assembly 1 can be improved. Therefore, the laser radar driving apparatus 200 with the improved response characteristics can be provided.

The second-direction drive main body member 60 making up the second-direction drive assembly 2 (FIG. 4) includes a substantially cylindrical substantially penetrating cavity-shaped housing space 69 (FIGS. 2, 4, and 6) corresponding to the first-direction drive assembly 1. The substantially cylindrical substantially penetrating cavity-shaped housing space 69 is disposed in the substantially rectangle box-shaped main body 68 of the second-direction drive main body member 60 making up the second-direction drive assembly 2. The first-direction drive assembly 1 is rotatably housed and disposed in the substantially cylindrical substantially penetrating cavity-shaped housing space 69.

If the friction support type laser radar driving apparatus 200 is configured as above, the first-direction drive assembly 1 making up the laser radar driving apparatus 200 is freely turned within a predetermined range of angle substantially in the first direction D1 in the substantially cylindrical substantially penetrating cavity-shaped housing space 69 of the second-direction drive main body member 60 configuring the second-direction drive assembly 2 without other objects blocking the movement thereof. The first-direction drive assembly 1 housed and disposed in the substantially cylindrical substantially penetrating cavity-shaped housing space 69 of the second-direction drive main body member 60 making up the second-direction drive assembly 2 is freely turned within a predetermined range of angle substantially in the first direction D1 without interference from other objects.

Since the substantially cylindrical substantially penetrating cavity-shaped housing space 69 is disposed in the substantially rectangle box-shaped main body 68 of the second-direction drive main body member 60 making up the second-direction drive assembly 2, the second-direction drive main body member 60 making up the second-direction drive assembly 2 can be reduced in weight. Since the second-direction drive main body member 60 making up the second-direction drive assembly 2 is reduced in weight, the turning characteristics of the second-direction drive assembly 2 can be improved. Therefore, the laser radar driving apparatus 200 with the improved response characteristics can be provided.

Since the first-direction drive assembly 1 is housed and disposed in the substantially cylindrical housing space 69 of the second-direction drive main body member 60 making up the second-direction drive assembly 2, space saving can be provided in the laser radar driving apparatus 200. Therefore, the miniaturized laser radar driving apparatus 200 can be provided.

The friction support type laser radar driving apparatus 200 (FIG. 1) includes one frame yoke 100 (FIGS. 1, 2, 5 to 7), in a substantially U-shape in a plan view, capable of holding the second-direction drive assembly 2 to which the first-direction drive assembly 1 is rotatably assembled. As shown in FIGS. 1, 2, and 6, the one second-direction drive assembly 2 including the one first-direction drive assembly 1 is rotatably assembled to the one frame yoke 100.

If the friction support type laser radar driving apparatus 200 is configured as above, the response characteristics of the laser radar driving apparatus 200 are easily improved. Since the one second-direction drive assembly 2 rotatably provided for the one first-direction drive assembly 1 is rotatably assembled to the one frame yoke 100, in a substantially U-shape in a plan view, capable of holding the second-direction drive assembly 2, the second-direction drive assembly 2 including the first-direction drive assembly 1 is easily turned relative to the frame yoke 100. Since the large second-direction drive assembly 2 capable of turning substantially in the second direction D2 is rotatably assembled to the frame yoke 100, the turning ability of the second-direction drive assembly 2 relative to the frame yoke 100 is improved. Therefore, the friction support type laser radar driving apparatus 200 can be provided, which has the improved response characteristics when the second-direction drive assembly 2 is turned substantially in the second direction D2.

The frame yoke 100 includes the substantially rectangle box-shaped housing space 109 (FIG. 5) corresponding to the second-direction drive assembly 2 (FIG. 4) including the first-direction drive assembly 1 (FIG. 3). The second-direction drive assembly 2 (FIG. 4) including the first-direction drive assembly 1 (FIG. 3) is rotatably housed and disposed in the substantially rectangle box-shaped housing space 109 of the frame yoke 100 (FIGS. 1, 2, and 6).

If the friction support type laser radar driving apparatus 200 is configured as above, the second-direction drive assembly 2 including the first-direction drive assembly 1 making up the laser radar driving apparatus 200 is freely turned within a predetermined range of angle substantially in the second direction D2 in the substantially rectangle box-shaped housing space 109 of the frame yoke 100 without other objects blocking the movement thereof. The second-direction drive assembly 2 including the first-direction drive assembly 1 housed and disposed in the substantially rectangle box-shaped housing space 109 of the frame yoke 100 is freely turned within a predetermined range of angle substantially in the second direction D2 without interference from other objects.

Since the second-direction drive assembly 2 including the first-direction drive assembly 1 is housed and disposed in the substantially rectangle box-shaped housing space 109 of the frame yoke 100, space saving can be provided in the laser radar driving apparatus 200. Therefore, the miniaturized laser radar driving apparatus 200 can be provided.

The friction support type laser radar driving apparatus 200 (FIGS. 1, 2, 6, and 7) includes: the two first-direction drive magnets 31 and 32 (FIGS. 1, 2, 5 to 7) capable of driving the first-direction drive main body member 10 (FIGS. 3 and 6) including the optical member 6 (FIGS. 1 to 4, 6, and 7) substantially in the first direction D1 when the current 20Ia or 20Ib (FIGS. 5 and 7) is applied to the first-direction drive coil 20 corresponding to the one first-direction drive coil 20 (FIGS. 2, 5, and 6); the four second-direction drive magnets 81A, 81B, 82A, and 82B (FIGS. 5 and 7) capable of driving the second-direction drive main body member 60 (FIG. 4), to which the first-direction drive main body member 10 including the optical member 6 (FIGS. 3 and 6) is rotatably assembled, substantially in the second direction D2 when the current 70Ia or 70Ib (FIGS. 5 and 7) is applied to the second-direction drive coil 70 corresponding to the one second-direction drive coil 70 (FIGS. 1, 2, 4 to 7); and the one frame yoke 100 (FIGS. 1, 2, 5 to 7), in a substantially U-shape in a plan view, having the two first-direction drive magnets 31 and 32 (FIGS. 1, 2, 5 to 7) and the four second-direction drive magnets 81A, 81B, 82A, and 82B (FIGS. 5 and 7) fixed to inner side surface portions 101A and 102A.

The one second-direction drive assembly 2 including the one first-direction drive assembly 1 is rotatably assembled to the one frame yoke 100 in a substantially U-shape in a plan view (FIGS. 1, 2, 6, and 7). That is, the one two-direction drive assembly 4 is rotatably assembled to the one frame yoke 100 in a substantially U-shape in a plan view.

As shown in FIG. 5, the one first-direction drive coil 20 is substantially located in the effective magnetic fields of the two first-direction drive magnets 31 and 32 fixed to the one frame yoke 100, and two strip-shaped side portions 71 and 72 making up the one second-direction drive coil 70 are substantially located in the effective magnetic fields of the four second-direction drive magnets 81A, 81B, 82A, and 82B fixed to the one frame yoke 100. Among the four second-direction drive magnets 81A, 81B, 82A, and 82B fixed to the one frame yoke 100, the one strip-shaped side portion 71 making up the one second-direction drive coil 70 is substantially located in the effective magnetic field of one set of the two second-direction drive magnets 81A and 81B, and the other strip-shaped side portion 72 making up the one second-direction drive coil 70 is substantially located in the effective magnetic field of the other set of the two second-direction drive magnets 82A and 82B.

If the friction support type laser radar driving apparatus 200 is configured as above, the response characteristics of the laser radar driving apparatus 200 are improved. When one second-direction drive assembly 2 including the one first-direction drive assembly 1, i.e., the one two-direction drive assembly 4 is rotatably assembled to the one frame yoke 100, in a substantially U-shape in a plan view, having the two first-direction drive magnets 31 and 32 fixed to the inner side surface portion 103A and the four second-direction drive magnets 81A, 81B, 82A, and 82B fixed to the inner side surface portions 101A and 102A, the one first-direction drive coil 20 is substantially located in the effective magnetic fields of the two first-direction drive magnets 31 and 32 fixed to the one frame yoke 100 and, therefore, when the current 20Ia or 20Ib is applied to the one first-direction drive coil 20 corresponding to the magnetic fields of the two first-direction drive magnets 31 and 32, the first-direction drive assembly 1 included in the second-direction drive assembly 2 making up the two-direction drive assembly 4 is quickly turned substantially in the first direction D1 by the electromagnetic forces 21Fa, 22Fa or 21Fb, 22Fb generated in the first-direction drive coil 20.

When one second-direction drive assembly 2 including the one first-direction drive assembly 1, i.e., the one two-direction drive assembly 4 is rotatably assembled to the one frame yoke 100, in a substantially U-shape in a plan view, having the two first-direction drive magnets 31 and 32 fixed to the inner side surface portion 103A and the four second-direction drive magnets 81A, 81B, 82A, and 82B fixed to the inner side surface portions 101A and 102A, the two strip-shaped side portions 71 and 72 making up the one second-direction drive coil 70 are substantially located in the effective magnetic fields of the four second-direction drive magnets 81A, 81B, 82A, and 82B fixed to the one frame yoke 100 and, therefore, when the current 70Ia or 70Ib is applied to the one second-direction drive coil 70 corresponding to the magnetic fields of the four second-direction drive magnets 81A, 81B, 82A, and 82B, the second-direction drive assembly 2 including the first-direction drive assembly 1, i.e., the one two-direction drive assembly 4 is quickly turned substantially in the second direction D2 by the electromagnetic forces 71AFa, 71BFa, 72AFa, 72BFa, or 71AFb, 71BFb, 72AFb, and 72BFb generated in the second-direction drive coil 70. Since the first-direction drive assembly 1 making up the two-direction drive assembly 4 or the second-direction drive assembly 2 making up the two-direction drive assembly 4 is quickly turned, the response characteristics of the laser radar driving apparatus 200 including the two-direction drive assembly 4 are improved.

The frame yoke 100 (FIG. 5) making up the laser radar driving apparatus 200 (FIGS. 1, 2, 6, and 7) includes, for example, the substantially rectangle box-shaped housing space 109 (FIG. 5) having mounted thereon the first-direction drive magnets 31 and 32 (FIGS. 1, 2, 5 and 6) and the second-direction drive magnets 81A, 81B, 82A, and 82B (FIGS. 5 and 7) corresponding to the second-direction drive assembly 2 including the first-direction drive assembly 1 (FIG. 4). The second-direction drive assembly 2 (FIG. 4) including the first-direction drive assembly 1 (FIG. 3) is rotatably housed and disposed without interference from other objects (FIGS. 1, 2, and 6) in the substantially rectangle box-shaped housing space 109 of the frame yoke 100 having mounted thereon the first-direction drive magnets 31 and 32 and the second-direction drive magnets 81A, 81B, 82A, and 82B.

If the friction support type laser radar driving apparatus 200 is configured as above, the second-direction drive assembly 2 including the first-direction drive assembly 1 making up the laser radar driving apparatus 200 is freely turned within a predetermined range of angle without other objects blocking the movement thereof substantially in the second direction D2 in the substantially rectangle box-shaped housing space 109 of the frame yoke 100 having the first-direction drive magnets 31 and 32 and the second-direction drive magnets 81A, 81B, 82A, and 82B disposed thereon. Even if the first-direction drive magnets 31 and 32 and the second-direction drive magnets 81A, 81B, 82A, and 82B are disposed in the substantially rectangle box-shaped housing space 109 of the frame yoke 100, the second-direction drive assembly 2 including the first-direction drive assembly 1 housed and disposed in the substantially rectangle box-shaped housing space 109 of the frame yoke 100 is freely turned substantially in the second direction D2 within a predetermined range of angle without interference from other objects.

Since the second-direction drive assembly 2 including the first-direction drive assembly 1 is housed and disposed in the substantially rectangle box-shaped housing space 109 of the frame yoke 100 having the first-direction drive magnets 31 and 32 and the second-direction drive magnets 81A, 81B, 82A, and 82B, space saving can be provided in the laser radar driving apparatus 200. Therefore, the miniaturized laser radar driving apparatus 200 can be provided.

The friction support type laser radar driving apparatus 200 (FIGS. 1, 2, 6, and 7) includes a pair of the left and right substantially rectangle flat-plate first-direction drive magnets 31 and 32 (FIGS. 1, 2, 5 to 7) corresponding to the substantially rectangle annular flat-plate first-direction drive coil 20 (FIG. 5) and two pairs of the left and right substantially square flat-plate second-direction drive magnets 81A, 81B, 82A, and 82B (FIGS. 5 and 7) corresponding to the substantially rectangle annular cylindrical second-direction drive coil 70 (FIG. 5).

The first-direction drive coil 20 is configured as the substantially rectangle annular flat-plate coil 20. The second-direction drive coil 70 is configured as the substantially rectangle annular cylindrical coil 70. As shown in FIGS. 5 and 6, a plurality of the substantially rectangle flat-plate first-direction drive magnets 31 and 32 is so fixed and disposed on the center inner side surface portion 103A of the irregular-shaped sidewall portion 103 making up the frame yoke 100 as to be confronted with the one surface portion 20A of the substantially rectangle annular flat-plate first-direction drive coil 20 with an appropriate space therebetween. As shown in FIGS. 5 and 7, a plurality of the substantially square flat-plate second-direction drive magnets 81A and 81B is so fixed and disposed on the inner side surface portion 101A of the first sidewall portion 101 making up the frame yoke 100 as to be confronted with a first side surface portion 71C of the substantially rectangle annular cylindrical second-direction drive coil 70 with an appropriate space therebetween. A plurality of the substantially square flat-plate second-direction drive magnets 82A and 82B is so fixed and disposed on the inner side surface portion 102A of the second sidewall portion 102 making up the frame yoke 100 as to be confronted with a second side surface portion 72C of the substantially rectangle annular cylindrical second-direction drive coil 70 with an appropriate space therebetween.

If the friction support type laser radar driving apparatus 200 is configured as above, the response characteristics of the laser radar driving apparatus 200 are improved. Since the pair of the left and right substantially rectangle flat-plate first-direction drive magnets 31 and 32 (FIG. 5) is so disposed on the center inner side surface portion 103A of the irregular-shaped sidewall portion 103 making up the frame yoke 100 as to be confronted with the one surface portion 20A of the substantially rectangle annular flat-plate first-direction drive coil 20 with an appropriate space therebetween, when the current 20Ia or 20Ib is applied to the substantially rectangle annular flat-plate first-direction drive coil 20, the driving forces 21Fa, 22Fa or 21Fb, 22Fb are generated in the substantially rectangle annular flat-plate first-direction drive coil 20 due to the magnetic force line 31L generated in the substantially rectangle flat-plate first-direction drive magnet 31 and the magnetic force line 32L generated in the substantially rectangle flat-plate first-direction drive magnet 32.

The current 20Ia or 20Ib is applied to the substantially rectangle annular flat-plate first-direction drive coil 20 confronted with the substantially rectangle flat-plate first-direction drive magnet 31 generating the magnetic force line 31L with an appropriate space therebetween. On this occasion, the electromagnetic force 21Fa or 21Fb is generated in the first side portion 21 of the substantially rectangle annular flat-plate first-direction drive coil 20. The current 20Ia or 20Ib is applied to the substantially rectangle annular flat-plate first-direction drive coil 20 confronted with the substantially rectangle flat-plate first-direction drive magnet 32 generating the magnetic force line 32L with an appropriate space therebetween. On this occasion, the electromagnetic force 22Fa or 22Fb is generated in the second side portion 22 of the substantially rectangle annular flat-plate first-direction drive coil 20. The first-direction drive assembly 1 (FIG. 6) including the substantially rectangle annular flat-plate first-direction drive coil 20 is smoothly turned around the first-direction drive turning shaft 10A of the first-direction drive assembly 1 substantially in the first direction D1, i.e., the lateral turn direction D1, by the electromagnetic forces 21Fa, 22Fa or 21Fb, 22Fb generated in the substantially rectangle annular flat-plate first-direction drive coil 20.

Since one pair of the substantially square flat-plate second-direction drive magnets 81A and 81B among the two pairs of the left and right substantially square flat-plate second-direction drive magnets 81A, 81B, 82A, and 82B (FIG. 5) is so disposed on the inner side surface portion 101A of the first sidewall portion 101 making up the frame yoke 100 as to be confronted with the first side surface portion 71C of the substantially rectangle annular cylindrical second-direction drive coil 70 with an appropriate space therebetween, when the current 70Ia or 70Ib is applied to the substantially rectangle annular cylindrical second-direction drive coil 70, the driving forces 71AFa, 71BFa or 71AFb, 71BFb are generated in the first side surface portion 71C of the substantially rectangle annular cylindrical second-direction drive coil 70, due to the magnetic force line 81AL generated in the substantially square flat-plate second-direction drive magnet 81A and the magnetic force line 81BL generated in the substantially square flat-plate second-direction drive magnet 81B.

The current 70Ia or 70Ib is applied to the first side surface portion 71C of the substantially rectangle annular cylindrical second-direction drive coil 70 confronted with the substantially square flat-plate second-direction drive magnet 81A generating the magnetic force line 81AL and the substantially square flat-plate second-direction drive magnet 81B generating the magnetic force line 81BL with an appropriate space therebetween. On this occasion, the electromagnetic forces 71AFa, 71BFa or 71AFb, 71BFb are generated in the first side surface portion 71C of the substantially rectangle annular cylindrical second-direction drive coil 70.

Since the other pair of the substantially square flat-plate second-direction drive magnets 82A and 82B among the two pairs of the left and right substantially square flat-plate second-direction drive magnets 81A, 81B, 82A, and 82B (FIG. 5 is so disposed on the inner side surface portion 102A of the second sidewall portion 102 making up the frame yoke 100) as to be confronted with the second side surface portion 72C of the substantially rectangle annular cylindrical second-direction drive coil 70 with an appropriate space therebetween, when the current 70Ia or 70Ib is applied to the substantially rectangle annular cylindrical second-direction drive coil 70, the driving forces 72AFa, 72BFa or 72AFb, 72BFb are generated in the second side surface portion 72C of the substantially rectangle annular cylindrical second-direction drive coil 70 due to the magnetic force line 82AL generated in the substantially square flat-plate second-direction drive magnet 82A and the magnetic force line 82BL generated in the substantially square flat-plate second-direction drive magnet 82B.

The current 70Ia or 70Ib is applied to the second side surface portion 72C of the substantially rectangle annular cylindrical second-direction drive coil 70 confronted with the substantially square flat-plate second-direction drive magnet 82A generating the magnetic force line 82AL and the substantially square flat-plate second-direction drive magnet 82B generating the magnetic force line 82BL with an appropriate space therebetween. On this occasion, the electromagnetic forces 72AFa, 72BFa or 72AFb, 72BFb are generated in the second side surface portion 72C of the substantially rectangle annular cylindrical second-direction drive coil 70.

The second-direction drive assembly 2 (FIG. 7) including the substantially rectangle annular cylindrical second-direction drive coil 70 is smoothly turned around the second-direction drive turning shaft 60A of the second-direction drive assembly 2 substantially in the second direction D2, i.e., the longitudinal turn direction D2, by the electromagnetic forces 71AFa, 71BFa, 72AFa, 72BFa, or 71AFb, 71BFb, 72AFb, 72BFb generated in the substantially rectangle annular cylindrical second-direction drive coil 70.

This friction support type laser radar driving apparatus 200 (FIGS. 1, 2, 6, and 7) includes the first first-direction drive magnet 31 (FIGS. 5 to 7) corresponding to the first side portion 21 of the substantially rectangle annular flat-plate first-direction drive coil 20 (FIG. 5) and the second first-direction drive magnet 32 (FIGS. 5 to 7) corresponding to the second side portion 22 of the substantially rectangle annular flat-plate first-direction drive coil 20 (FIG. 5).

For the one first-direction drive coil 20 (FIGS. 5 and 6), the two first-direction drive magnets 31 and 32 are disposed on the rear center inner side surface portion 103A of the frame yoke 100. For example, thermosetting adhesives not shown having excellent adhesiveness such as epoxy resin are used to fix the two first-direction drive magnets 31 and 32 to the rear center inner side surface portion 103A of the third sidewall portion 103 making up the frame yoke 100.

The first first-direction drive magnet 31 (FIG. 6) is formed as the substantially rectangle flat-plate double-sided two-pole magnetized magnet 31 including the substantially flat N pole portion 31N and the substantially flat S pole portion 31S that is the opposite pole portion of the substantially flat N pole portion 31N (FIGS. 5 to 7). The second first-direction drive magnet 32 (FIG. 6) is formed as the substantially rectangle flat-plate double-sided two-pole magnetized magnet 32 including the substantially flat N pole portion 32N and the substantially flat S pole portion 32S that is the opposite pole portion of the substantially flat N pole portion 32N (FIGS. 5 to 7).

For example, the magnetic force line 31L emitted from the substantially flat N pole portion 31N of the first first-direction drive magnet 31 (FIGS. 5 and 6) widely curves and enters as the magnetic force line 32L into the substantially flat S pole portion 32S of the second first-direction drive magnet 32. The magnetic force line (not shown) emitted from the substantially flat N pole portion 32N of the second first-direction drive magnet 32 (FIG. 6) widely curves and enters into the substantially flat S pole portion 31S of the first first-direction drive magnet 31.

The first-direction drive coil 20 (FIG. 5) is formed as the substantially rectangle annular flat-plate coil 20 including: the substantially flat first side portion 21 corresponding to the substantially flat N pole portion 31N of the first first-direction drive magnet 31; the substantially flat second side portion 22, which is the opposite side portion of the substantially flat first side portion 21, corresponding to the substantially flat S pole portion 32S of the second first-direction drive magnet 32; the substantially flat third side portion 23 substantially orthogonal to the substantially flat first side portion 21 and the substantially flat second side portion 22 and coupled to the substantially flat first side portion 21 and the substantially flat second side portion 22; and the substantially flat fourth side portion 24, which is the opposite side portion of the third side portion 23, substantially orthogonal to the substantially flat first side portion 21 and the substantially flat second side portion 22 and coupled to the substantially flat first side portion 21 and the substantially flat second side portion 22.

The substantially flat N pole portion 31N of the first first-direction drive magnet 31 (FIGS. 5 and 6) is closely confronted with the substantially flat first side portion 21 of the substantially rectangle annular flat-plate first-direction drive coil 20. The substantially flat S pole portion 32S of the second first-direction drive magnet 32 is closely confronted with the substantially flat second side portion 22 of the substantially rectangle annular flat-plate first-direction drive coil 20.

This friction support type laser radar driving apparatus 200 (FIGS. 1, 2, 6, and 7) includes: the first second-direction drive magnet 81A (FIGS. 5 to 7) corresponding to an upper first-side portion 71A of the substantially rectangle annular cylindrical second-direction drive coil 70 (FIG. 5); the second second-direction drive magnet 81B (FIGS. 5 and 7) corresponding to a lower first-side portion 71B of the substantially rectangle annular cylindrical second-direction drive coil 70 (FIG. 5); the third second-direction drive magnet 82A (FIGS. 5 to 7) corresponding to an upper second-side portion 72A of the substantially rectangle annular cylindrical second-direction drive coil 70 (FIG. 5); and the fourth second-direction drive magnet 82B (FIGS. 5 and 7) corresponding to a lower second-side portion 72B of the substantially rectangle annular cylindrical second-direction drive coil 70 (FIG. 5).

For the one second-direction drive coil 70, the four second-direction drive magnets 81A, 81B, 82A, and 82B are disposed on the inner side surface portions 101A and 102A on both sides of the frame yoke 100. For example, a thermosetting adhesive not shown having excellent adhesiveness such as epoxy resin is used to fix the two second-direction drive magnets 81A and 81B to the inner side surface portion 101A of the first sidewall portion 101 making up the frame yoke 100. For example, a thermosetting adhesive not shown having excellent adhesiveness such as epoxy resin is used to fix the two second-direction drive magnets 82A and 82B to the inner side surface portion 102A of the second sidewall portion 102 making up the frame yoke 100.

The first second-direction drive magnet 81A (FIGS. 6 and 7) is formed as the substantially square flat-plate double-sided two-pole magnetized magnet 81A including the substantially flat N pole portion 81AN and the substantially flat S pole portion 81AS that is the opposite pole portion of the substantially flat N pole portion 81AN. The second second-direction drive magnet 81B (FIG. 7) is formed as the substantially square flat-plate double-sided two-pole magnetized magnet 81B including the substantially flat N pole portion 81BN and the substantially flat S pole portion 81BS that is the opposite pole portion of the substantially flat N pole portion 81BN. The third second-direction drive magnet 82A (FIGS. 6 and 7) is formed as the substantially square flat-plate double-sided two-pole magnetized magnet 82A including the substantially flat N pole portion 82AN and the substantially flat S pole portion 82AS that is the opposite pole portion of the substantially flat N pole portion 82AN. The fourth second-direction drive magnet 82B (FIG. 7) is formed as the substantially square flat-plate double-sided two-pole magnetized magnet 82B including the substantially flat N pole portion 82BN and the substantially flat S pole portion 82BS that is the opposite pole portion of the substantially flat N pole portion 82BN.

For example, the magnetic force line 81AL emitted from the substantially flat N pole portion 81AN of the first second-direction drive magnet 81A (FIGS. 5 and 7) widely curves and enters as the magnetic force line 81BL into the substantially flat S pole portion 81BS of the second second-direction drive magnet 81B. The magnetic force line (not shown) emitted from the substantially flat N pole portion 81BN of the second second-direction drive magnet 81B (FIG. 7) widely curves and enters into the substantially flat S pole portion 81AS of the first second-direction drive magnet 81A. For example, the magnetic force line 82AL emitted from the substantially flat N pole portion 82AN of the third second-direction drive magnet 82A widely curves and enters as the magnetic force line 82BL into the substantially flat S pole portion 82BS of the fourth second-direction drive magnet 82B. The magnetic force line (not shown) emitted from the substantially flat N pole portion 82BN of the fourth second-direction drive magnet 82B widely curves and enters into the substantially flat S pole portion 82AS of the third second-direction drive magnet 82A.

The second-direction drive coil 70 (FIGS. 5 and 7) is formed as the substantially rectangle annular cylindrical coil 70 including: the substantially flat-plate first side portion 71 corresponding to the substantially flat N pole portion 81AN of the first second-direction drive magnet 81A and corresponding to the substantially flat S pole portion 81BS of the second second-direction drive magnet 81B; the substantially flat-plate second side portion 72, which is the opposite side portion of the substantially flat-plate first side portion 71, corresponding to the substantially flat N pole portion 82AN of the third second-direction drive magnet 82A (FIG. 7) and corresponding to the substantially flat S pole portion 82BS of the fourth second-direction drive magnet 82B; the substantially flat third side portion 73 substantially orthogonal to the substantially flat first side portion 71 (FIGS. 5 and 7) and the substantially flat second side portion 72 and coupled to the substantially flat first side portion 71 and the substantially flat second side portion 72; and the substantially flat fourth side portion 74, which is the opposite side portion of the third side portion 73, substantially orthogonal to the substantially flat first side portion 71 and the substantially flat second side portion 72 and coupled to the substantially flat first side portion 71 and the substantially flat second side portion 72.

The substantially flat N pole portion 81AN of the first second-direction drive magnet 81A is closely confronted with the upper portion 71A of the substantially flat-plate first side portion 71 of the substantially rectangle annular cylindrical second-direction drive coil 70, and the substantially flat S pole portion 81BS of the second second-direction drive magnet 81B is closely confronted with the lower portion 71B of the substantially flat-plate first side portion 71 of the substantially rectangle annular cylindrical second-direction drive coil 70. The substantially flat N pole portion 82AN of the third second-direction drive magnet 82A (FIG. 7) is closely faced with the upper portion 72A of the substantially flat-plate second side portion 72 of the substantially rectangle annular cylindrical second-direction drive coil 70, and the substantially flat S pole portion 82BS of the fourth second-direction drive magnet 82B is closely confronted with the lower portion 72B of the substantially flat-plate second side portion 72 of the substantially rectangle annular cylindrical second-direction drive coil 70.

If the friction support type laser radar driving apparatus 200 is configured as above, the response characteristics of the laser radar driving apparatus 200 are further improved. When the clockwise current 20Ia or the counterclockwise current 20Ib is applied to the substantially rectangle annular flat-plate first-direction drive coil 20 (FIGS. 5 and 7) making up the first-direction drive assembly 1 (FIG. 3), the first-direction drive assembly 1 (FIGS. 3 and 4) is quickly turned substantially in the first direction D1. When the clockwise current 70Ia or the counterclockwise current 70Ib is applied to the substantially rectangle annular cylindrical second-direction drive coil 70 (FIGS. 5 and 7) making up the second-direction drive assembly 2 (FIG. 4), the second-direction drive assembly 2 including the first-direction drive assembly 1 (FIGS. 1 and 4) is quickly turned substantially in the second direction D2.

Since the substantially flat N pole portion 31N of the first substantially rectangle flat-plate first-direction drive magnet 31 is closely confronted with the substantially flat first side portion 21 of the substantially rectangle annular flat-plate first-direction drive coil 20, when the upward current 20I*a* is applied to the substantially flat first side portion 21 of the substantially rectangle annular flat-plate first-direction drive coil 20, the rightward driving force 21Fa is generated in the substantially flat first side portion 21 of the substantially rectangle annular flat-plate first-direction drive coil 20 due to the magnetic force line 31L toward the substantially near side generated in the substantially flat N pole portion 31N of the first substantially rectangle flat-plate first-direction drive magnet 31.

Since the substantially flat S pole portion 32S of the second substantially rectangle flat-plate first-direction drive magnet 32 is closely confronted with the substantially flat second side portion 22 of the substantially rectangle annular flat-plate first-direction drive coil 20, when the downward current 20Ia is applied to the substantially flat second side portion 22 of the substantially rectangle annular flat-plate first-direction drive coil 20, the rightward driving force 22Fa is generated in the substantially flat second side portion 22 of the substantially rectangle annular flat-plate first-direction drive coil 20 due to the magnetic force line 32L toward the substantially far side generated in the substantially flat S pole portion 32S of the second substantially rectangle flat-plate first-direction drive magnet 32.

The upward current 20I*a* is applied to the substantially flat first side portion 21 of the substantially rectangle annular flat-plate first-direction drive coil 20 closely confronted with the substantially flat N pole portion 31N of the first substantially rectangle flat-plate first-direction drive magnet 31 generating the magnetic force line 31L toward the substantially near side. The downward current 20Ia is also applied to the substantially flat second side portion 22 of the substantially rectangle annular flat-plate first-direction drive coil 20 closely confronted with the substantially flat S pole portion 32S of the second substantially rectangle flat-plate first-direction drive magnet 32 generating the magnetic force line 32L toward the substantially far side.

On this occasion, the rightward electromagnetic force 21Fa resulting from the magnetic field generated in the substantially flat first side portion 21 of the substantially rectangle annular flat-plate first-direction drive coil 20 is combined with the rightward electromagnetic force 22Fa resulting from the magnetic field generated in the substantially flat second side portion 22 of the substantially rectangle annular flat-plate first-direction drive coil 20. Since the rightward electromagnetic force 21Fa is combined with the rightward electromagnetic force 22Fa, the first-direction drive assembly 1 including the substantially rectangle annular flat-plate first-direction drive coil 20 is smoothly turned around the first-direction drive turning shaft 10A of the first-direction drive assembly 1 substantially in the left turn direction D1*a*.

Since the substantially flat N pole portion 31N of the first substantially rectangle flat-plate first-direction drive magnet 31 is closely confronted with the substantially flat first side portion 21 of the substantially rectangle annular flat-plate first-direction drive coil 20, when the downward current 20Ib is applied to the substantially flat first side portion 21 of the substantially rectangle annular flat-plate first-direction drive coil 20, the leftward driving force 21Fb is generated in the substantially flat first side portion 21 of the substantially rectangle annular flat-plate first-direction drive coil 20 due to the magnetic force line 31L toward the substantially near side generated in the substantially flat N pole portion 31N of the first substantially rectangle flat-plate first-direction drive magnet 31.

Since the substantially flat S pole portion 32S of the second substantially rectangle flat-plate first-direction drive magnet 32 is closely confronted with the substantially flat second side portion 22 of the substantially rectangle annular flat-plate first-direction drive coil 20, when the upward current 20Ib is applied to the substantially flat second side portion 22 of the substantially rectangle annular flat-plate first-direction drive coil 20, the leftward driving force 22Fb is generated in the substantially flat second side portion 22 of the substantially rectangle annular flat-plate first-direction drive coil 20 due to the magnetic force line 32L toward the substantially far side generated in the substantially flat S pole portion 32S of the second substantially rectangle flat-plate first-direction drive magnet 32.

The downward current 20Ib is applied to the substantially flat first side portion 21 of the substantially rectangle annular flat-plate first-direction drive coil 20 closely confronted with the substantially flat N pole portion 31N of the first substantially rectangle flat-plate first-direction drive magnet 31 generating the magnetic force line 31L toward the substantially near side. The upward current 20Ib is also applied to the substantially flat second side portion 22 of the substantially rectangle annular flat-plate first-direction drive coil 20 closely confronted with the substantially flat S pole portion 32S of the second substantially rectangle flat-plate first-direction drive magnet 32 generating the magnetic force line 32L toward the substantially far side.

On this occasion, the leftward electromagnetic force 21Fb resulting from the magnetic field generated in the substantially flat first side portion 21 of the substantially rectangle annular flat-plate first-direction drive coil 20 is combined with the leftward electromagnetic force 22Fb resulting from the magnetic field generated in the substantially flat second side portion 22 of the substantially rectangle annular flat-plate first-direction drive coil 20. Since the leftward electromagnetic force 21Fb is combined with the leftward electromagnetic force 22Fb, the first-direction drive assembly 1 including the substantially rectangle annular flat-plate first-direction drive coil 20 is smoothly turned around the first-direction drive turning shaft 10A of the first-direction drive assembly 1 substantially in the right turn direction D1*b*.

When the one small first-direction drive assembly 1 is turned substantially in the first turn direction D1, which includes the one optical member 6 (FIG. 3), the one small substantially rectangle annular first-direction drive coil 20, and the one small first-direction drive main body member 10, since the current 20Ia or 20Ib (FIG. 5) is applied to the one small substantially rectangle annular first-direction drive coil 20 corresponding to the magnetic fields generated in the first-direction drive magnets 31 and 32 (FIGS. 2, 5, and 6), the electromagnetic forces 21Fa, 22Fa or 21Fb, 22Fb is generated in the small substantially rectangle annular first-direction drive coil 20. The first-direction drive assembly 1 configured with mounting the optical member 6 and the first-direction drive coil 20 on the first-direction drive main body member 10 (FIG. 3) is turned substantially in the first direction D1 by the electromagnetic forces 21Fa, 22Fa or 21Fb, 22Fb generated in the one small substantially rectangle annular first-direction drive coil 20.

Since the substantially flat N pole portion 81AN of the first substantially square flat-plate second-direction drive magnet 81A is closely confronted with the upper portion 71A of the substantially flat-plate first side portion 71 of the substantially rectangle annular cylindrical second-direction drive coil 70, when the upward current 70Ia is applied to the upper portion 71A of the substantially flat first side portion 71 of the substantially rectangle annular cylindrical second-direction drive coil 70, the driving force 71AFa toward the far side is generated in the upper portion 71A of the substantially flat first side portion 71 of the substantially rectangle annular cylindrical second-direction drive coil 70 due to the substantially rightward magnetic force line 81AL generated in the substantially flat N pole portion 81AN of the first substantially square flat-plate second-direction drive magnet 81A.

Since the substantially flat S pole portion 81BS of the second substantially square flat-plate second-direction drive magnet 81B is closely confronted with the lower portion 71B of the substantially flat-plate first side portion 71 of the substantially rectangle annular cylindrical second-direction drive coil 70, when the upward current 70Ia is applied to the lower portion 71B of the substantially flat first side portion 71 of the substantially rectangle annular cylindrical second-direction drive coil 70, the driving force 71BFa toward the near side is generated in the lower portion 71B of the substantially flat first side portion 71 of the substantially rectangle annular cylindrical second-direction drive coil 70 due to the substantially leftward magnetic force line 81BL generated in the substantially flat S pole portion 81BS of the second substantially square flat-plate second-direction drive magnet 81B.

Since the substantially flat N pole portion 82AN of the third substantially square flat-plate second-direction drive magnet 82A is closely confronted with the upper portion 72A of the substantially flat-plate second side portion 72 of the substantially rectangle annular cylindrical second-direction drive coil 70, when the downward current 70Ia is applied to the upper portion 72A of the substantially flat second side portion 72 of the substantially rectangle annular cylindrical second-direction drive coil 70, the driving force 72AFa toward the far side is generated in the upper portion 72A of the substantially flat second side portion 72 of the substantially rectangle annular cylindrical second-direction drive coil 70 due to the substantially leftward magnetic force line 82AL generated in the substantially flat N pole portion 82AN of the third substantially square flat-plate second-direction drive magnet 82A.

Since the substantially flat S pole portion 82BS of the fourth substantially square flat-plate second-direction drive magnet 82B is closely confronted with the lower portion 72B of the substantially flat-plate second side portion 72 of the substantially rectangle annular cylindrical second-direction drive coil 70, when the downward current 70Ia is applied to the lower portion 72B of the substantially flat second side portion 72 of the substantially rectangle annular cylindrical second-direction drive coil 70, the driving force 72BFa toward the near side is generated in the lower portion 72B of the substantially flat second side portion 72 of the substantially rectangle annular cylindrical second-direction drive coil 70 due to the substantially rightward magnetic force line 82BL generated in the substantially flat S pole portion 82BS of the fourth substantially square flat-plate second-direction drive magnet 82B.

The upward current 70Ia is applied to the upper portion 71A of the substantially flat first side portion 71 of the substantially rectangle annular cylindrical second-direction drive coil 70 closely confronted with the substantially flat N pole portion 81AN of the first substantially square flat-plate second-direction drive magnet 81A generating the substantially rightward magnetic force line 81AL. The upward current 70I*a* is also applied to the lower portion 71B of the substantially flat first side portion 71 of the substantially rectangle annular cylindrical second-direction drive coil 70 closely confronted with the substantially flat S pole portion 81BS of the second substantially square flat-plate second-direction drive magnet 81B generating the substantially leftward magnetic force line 81BL. The downward current 70Ia is also applied to the upper portion 72A of the substantially flat second side portion 72 of the substantially rectangle annular cylindrical second-direction drive coil 70 closely confronted with the substantially flat N pole portion 82AN of the third substantially square flat-plate second-direction drive magnet 82A generating the substantially leftward magnetic force line 82AL. The downward current 70Ia is also applied to the lower portion 72B of the substantially flat second side portion 72 of the substantially rectangle annular cylindrical second-direction drive coil 70 closely confronted with the substantially flat S pole portion 82BS of the fourth substantially square flat-plate second-direction drive magnet 82B generating the substantially rightward magnetic force line 82BL.

On this occasion, the electromagnetic force 71AFa toward the far side resulting from the magnetic field generated in the upper portion 71A of the substantially flat first side portion 71 of the substantially rectangle annular cylindrical second-direction drive coil 70 is combined with the electromagnetic force 72AFa toward the far side resulting from the magnetic field generated in the upper portion 72A of the substantially flat second side portion 72 of the substantially rectangle annular cylindrical second-direction drive coil 70. The electromagnetic force 71BFa toward the near side resulting from the magnetic field generated in the lower portion 71B of the substantially flat first side portion 71 of the substantially rectangle annular cylindrical second-direction drive coil 70 is also combined with the electromagnetic force 72BFa toward the near side resulting from the magnetic field generated in the lower portion 72B of the substantially flat second side portion 72 of the substantially rectangle annular cylindrical second-direction drive coil 70.

Since the electromagnetic force 71AFa toward the far side is combined with the electromagnetic force 72AFa toward the far side and the electromagnetic force 71BFa toward the near side is combined with the electromagnetic force 72BFa toward the near side, the second-direction drive assembly 2 including the substantially rectangle annular cylindrical second-direction drive coil 70 is smoothly turned around the second-direction drive turning shaft 60A of the second-direction drive assembly 2 substantially in the upward turn direction D2a.

Since the substantially flat N pole portion 81AN of the first substantially square flat-plate second-direction drive magnet 81A is closely confronted with the upper portion 71A of the substantially flat-plate first side portion 71 of the substantially rectangle annular cylindrical second-direction drive coil 70, when the downward current 70Ib is applied to the upper portion 71A of the substantially flat first side portion 71 of the substantially rectangle annular cylindrical second-direction drive coil 70, the driving force 71AFb toward the near side is generated in the upper portion 71A of the substantially flat first side portion 71 of the substantially rectangle annular cylindrical second-direction drive coil 70 due to the substantially rightward magnetic force line 81AL generated in the substantially flat N pole portion 81AN of the first substantially square flat-plate second-direction drive magnet 81A.

Since the substantially flat S pole portion 81BS of the second substantially square flat-plate second-direction drive magnet 81B is closely confronted with the lower portion 71B of the substantially flat-plate first side portion 71 of the substantially rectangle annular cylindrical second-direction drive coil 70, when the downward current 70Ib is applied to the lower portion 71B of the substantially flat first side portion 71 of the substantially rectangle annular cylindrical second-direction drive coil 70, the driving force 71BFb toward the far side is generated in the lower portion 71B of the substantially flat first side portion 71 of the substantially rectangle annular cylindrical second-direction drive coil 70 due to the substantially leftward magnetic force line 81BL generated in the substantially flat S pole portion 81BS of the second substantially square flat-plate second-direction drive magnet 81B.

Since the substantially flat N pole portion 82AN of the third substantially square flat-plate second-direction drive magnet 82A is closely confronted with the upper portion 72A of the substantially flat-plate second side portion 72 of the substantially rectangle annular cylindrical second-direction drive coil 70, when the upward current 70Ib is applied to the upper portion 72A of the substantially flat second side portion 72 of the substantially rectangle annular cylindrical second-direction drive coil 70, the driving force 72AFb toward the near side is generated in the upper portion 72A of the substantially flat second side portion 72 of the substantially rectangle annular cylindrical second-direction drive coil 70 due to the substantially leftward magnetic force line 82AL generated in the substantially flat N pole portion 82AN of the third substantially square flat-plate second-direction drive magnet 82A.

Since the substantially flat S pole portion 82BS of the fourth substantially square flat-plate second-direction drive magnet 82B is closely confronted with the lower portion 72B of the substantially flat-plate second side portion 72 of the substantially rectangle annular cylindrical second-direction drive coil 70, when the upward current 70Ib is applied to the lower portion 72B of the substantially flat second side portion 72 of the substantially rectangle annular cylindrical second-direction drive coil 70, the driving force 72BFb toward the far side is generated in the lower portion 72B of the substantially flat second side portion 72 of the substantially rectangle annular cylindrical second-direction drive coil 70 due to the substantially rightward magnetic force line 82BL generated in the substantially flat S pole portion 82BS of the fourth substantially square flat-plate second-direction drive magnet 82B.

The downward current 70Ib is applied to the upper portion 71A of the substantially flat first side portion 71 of the substantially rectangle annular cylindrical second-direction drive coil 70 closely confronted with the substantially flat N pole portion 81AN of the first substantially square flat-plate second-direction drive magnet 81A generating the substantially rightward magnetic force line 81AL. The downward current 70Ib is also applied to the lower portion 71B of the substantially flat first side portion 71 of the substantially rectangle annular cylindrical second-direction drive coil 70 closely confronted with the substantially flat S pole portion 81BS of the second substantially square flat-plate second-direction drive magnet 81B generating the substantially leftward magnetic force line 81BL. The upward current 70Ib is also applied to the upper portion 72A of the substantially flat second side portion 72 of the substantially rectangle annular cylindrical second-direction drive coil 70 closely confronted with the substantially flat N pole portion 82AN of the third substantially square flat-plate second-direction drive magnet 82A generating the substantially leftward magnetic force line 82AL. The upward current 70Ib is also applied to the lower portion 72B of the substantially flat second side portion 72 of the substantially rectangle annular cylindrical second-direction drive coil 70 closely confronted with the substantially flat S pole portion 82BS of the fourth substantially square flat-plate second-direction drive magnet 82B generating the substantially rightward magnetic force line 82BL.

On this occasion, the electromagnetic force 71AFb toward the near side resulting from the magnetic field generated in the upper portion 71A of the substantially flat first side portion 71 of the substantially rectangle annular cylindrical second-direction drive coil 70 is combined with the electromagnetic force 72AFb toward the near side resulting from the magnetic field generated in the upper portion 72A of the substantially flat second side portion 72 of the substantially rectangle annular cylindrical second-direction drive coil 70. The electromagnetic force 71BFb toward the far side resulting from the magnetic field generated in the lower portion 71B of the substantially flat first side portion 71 of the substantially rectangle annular cylindrical second-direction drive coil 70 is also combined with the electromagnetic force 72BFb toward the far side resulting from the magnetic field generated in the lower portion 72B of the substantially flat second side portion 72 of the substantially rectangle annular cylindrical second-direction drive coil 70.

Since the electromagnetic force 71AFb toward the near side is combined with the electromagnetic force 72AFb toward the near side and the electromagnetic force 71BFb toward the far side is combined with the electromagnetic force 72BFb toward the far side, the second-direction drive assembly 2 including the substantially rectangle annular cylindrical second-direction drive coil 70 is smoothly turned around the second-direction drive turning shaft 60A of the second-direction drive assembly 2 substantially in the downward turn direction D2b.

When the one small first-direction drive assembly 1 (FIG. 3) is assembled to the one large second-direction drive assembly 2 including the one large substantially rectangle annular second-direction drive coil 70 (FIG. 4) and the one large second-direction drive main body member 60 so that the second-direction drive assembly 2 (FIG. 4) including the first-direction drive assembly 1 is turned substantially in the second turn direction D2, since the current 70Ia or 70Ib is applied to the one large substantially rectangle annular second-direction drive coil 70 corresponding to the magnetic fields generated in the second-direction drive magnets 81A, 81B, 82A, and 82B (FIG. 5), there are generated the electromagnetic forces 71AFa, 71BFa, 72AFa (FIG. 7), 72BFa, or 71AFb (FIG. 5), 71BFb, 72AFb (FIG. 7), 72BFb in the large substantially rectangle annular second-direction drive coil 70. The second-direction drive assembly 2 configured with mounting the second-direction drive coil 70 on the second-direction drive main body member (FIG. 4) is turned substantially in the second direction D2 along with the first-direction drive assembly 1 by the electromagnetic forces 71AFa (FIG. 5), 71BFa, 72AFa (FIG. 7), 72BFa, or 71AFb (FIG. 5), 71BFb, 72AFb (FIG. 7), 72BFb generated in the one large substantially rectangle annular second-direction drive coil 70 (FIG. 4).

The first-direction drive main body member 10 (FIG. 3) includes the first-direction drive slide turning shaft 10A capable of turning the first-direction drive assembly 1. The substantially round bar-shaped first-direction drive slide turning shaft 10A capable of turning the first-direction drive assembly 1 is projected from the main body 18 of the first-direction drive main body member 10. The second-direction drive main body member 60 (FIG. 4) includes a first slide shaft supporting portion 60B corresponding to the first-direction drive slide turning shaft 10A. The substantially U-shaped radial-bearing type first slide shaft supporting portion 60B is recessed in the main body 68 of the second-direction drive main body member 60 corresponding to the substantially round bar-shaped first-direction drive slide turning shaft 10A to which a radial load is applied.

If the friction support type laser radar driving apparatus 200 is configured as above, the response characteristics of the laser radar driving apparatus 200 are improved when the first-direction drive assembly 1 is turned substantially in the first direction D1. Since the substantially U-shaped radial-bearing type first slide shaft supporting portion 60B recessed in the main body 68 of the second-direction drive main body member 60 is assembled to the substantially round bar-shaped first-direction drive slide turning shaft 10A, which is protruded from the main body 18 of the first-direction drive main body member 10 and capable of turning the first-direction drive assembly 1 with the radial load being applied, the first-direction drive assembly 1 including the optical member 6, the first-direction drive coil 20, and the first-direction drive main body member 10 is certainly turned around the first-direction drive slide turning shaft 10A of the first-direction drive main body member 10 substantially in the first direction D1.

Since the substantially U-shaped first slide shaft supporting portion 60B corresponding to the substantially round bar-shaped first-direction drive slide turning shaft 10A is recessed in the main body 68 of the second-direction drive main body member 60, the apparatus assembly operation is easily and quickly performed when the first-direction drive main body member 10 making up the first-direction drive assembly 1 is assembled to the second-direction drive main body member 60 making up the second-direction drive assembly 2. This laser radar driving apparatus 200 is considered to have excellent assembly performance.

The both end portions 11E and 12E of the substantially round bar-shaped slide turning shaft 10A for driving in the first direction D1 substantially corresponding to the radial load are provided with substantially circular plate-shaped thrust-slide-bearing type axial-direction positioning portions 11D and 12D that prevent the position of the first-direction drive assembly 1 from being considerably displaced substantially in the axial direction D10 of the first-direction drive slide turning shaft 10A (FIG. 3) relative to the second-direction drive main body member 60 (FIG. 4). The substantially circular plate-shaped thrust-slide-bearing type first positioning portion 11D is disposed on the first end portion 11E of the first-direction drive turning shaft 10A, and the substantially circular plate-shaped thrust-slide-bearing type second positioning portion 12D is disposed on the second end portion 12E of the first-direction drive turning shaft 10A.

Therefore, the first-direction drive assembly 1 making up the laser radar driving apparatus 200 is certainly turned in a reciprocating manner substantially in the first direction D1. Since the both end portions 11E and 12E of the substantially round bar-shaped slide turning shaft 10A for driving in the first direction D1 substantially corresponding to the radial load are provided with substantially circular plate-shaped thrust-slide-bearing type axial-direction positioning portions 11D and 12D that prevent the position of the first-direction drive assembly 1 from being considerably displaced from the second-direction drive main body member 60 substantially in the axial direction D10 of the first-direction drive slide turning shaft 10A, when the first-direction drive assembly 1 is reciprocatingly turned relative to the second-direction drive assembly 2, the considerable displacement of the first-direction drive assembly 1 relative to the second-direction drive assembly 2 does not occur. The first-direction drive assembly 1 is accurately turned in a reciprocating manner substantially in the first direction D1 relative to the second-direction drive assembly 2.

The first-direction drive main body member 10 (FIG. 3) includes a pair of the upper and lower shaft portions 11A and 12A. The upper shaft portion 11A is protruded from the upper surface portion 11 of the substantially rectangle box-shaped main body 18 making up the first-direction drive main body member 10. The lower shaft portion 12A is protruded from the lower surface portion 12 of the substantially rectangle box-shaped main body 18 making up the first-direction drive main body member 10. The second-direction drive main body member 60 (FIG. 4) includes a pair of upper and lower bearing portions 61B and 62B (FIG. 4) in slidable contact with the pair of the upper and lower shaft portions 11A and 12A of the first-direction drive main body member 10 (FIG. 3). The upper bearing portion 61B is recessed in an upper surface portion 61 of the substantially rectangle box-shaped main body 68 making up the second-direction drive main body member 60. The lower bearing portion 62B is recessed in a lower surface portion 62 of the substantially rectangle box-shaped main body 68 making up the second-direction drive main body member 60.

The first shaft portion 11A of the first-direction drive turning shaft 10A protruded from the main body 18 of the first-direction drive main body member 10 (FIG. 3) is assembled to the first bearing portion 61B of the first shaft supporting portion 60B formed in the main body 68 of the second-direction drive main body member 60 (FIG. 4) and the second shaft portion 12A of the first-direction drive turning shaft 10A protruded from the main body 18 of the first-direction drive main body member 10 (FIG. 3) is assembled to the second bearing portion 62B of the first shaft supporting portion 60B formed in the main body 68 of the second-direction drive main body member 60 (FIG. 4) so that the first-direction drive main body member 10 is mounted on the second-direction drive main body member 60 (FIG. 4). Due to the substantially circular plate-shaped positioning portions 11D and 12D, which are disposed on the both end portions 11E and 12E of the first-direction drive turning shaft 10A (FIG. 3) and have a greater diameter than the substantially round bar-shaped shaft portions 11A and 12A, the second-direction drive main body member 60 (FIG. 4) is easily provided in an aligned state with the first-direction drive main body member 10.

The first-direction drive turning shaft 11A of the first-direction drive main body member 10 (FIG. 3) includes a pair of the upper and lower axial-direction positioning portions 11D and 12D. The upper axial-direction positioning portion 11D is disposed on the upper end portion 11E of the upper shaft portion 11A of the first-direction drive turning shaft 10A. The lower axial-direction positioning portion 12D is disposed on the lower end portion 12E of the lower shaft portion 12A of the first-direction drive turning shaft 10A. The second-direction drive main body member 60 (FIG. 4) includes a pair of the upper and lower side surface portions 61 and 62 (FIG. 4) in slidable contact with a pair of the upper and lower axial-direction positioning portions 11D and 12D of the first-direction drive turning shaft 10A (FIG. 3). The upper axial-direction positioning portion 11D disposed on the upper end portion 11E of the upper shaft portion 11A of the first-direction drive turning shaft 10A (FIG. 3) is in slidable contact with the upper side surface portion 61 of the second-direction drive main body member 60 (FIG. 4). The lower axial-direction positioning portion 12D disposed on the lower end portion 12E of the lower shaft portion 12A of the first-direction drive turning shaft 10A (FIG. 3) is in slidable contact with the lower side surface portion 62 of the second-direction drive main body member 60 (FIG. 4).

After the second-direction drive main body member 60 has been provided with the first-direction drive main body member 10, the first shaft portion 11A of the first-direction drive turning shaft 10A protruded from the main body 18 of the first-direction drive main body member 10 is pressed by a first pressing member (not shown) and the second shaft portion 12A of the first-direction drive turning shaft 10A protruded from the main body 18 of the first-direction drive main body member 10 is pressed by a second pressing member (not shown) so that the first-direction drive main body member 10 is certainly assembled to the second-direction drive main body member 60.

For example, each pressing member such as a pressing spring in a substantially convex shape not shown is formed correspondingly to the substantially U-shaped first shaft supporting portion 60B assembled to the substantially round bar-shaped first-direction drive turning shaft 10A. After the substantially U-shaped first direction drive turning shaft 10A is rotatably has been assembled to the substantially round bar-shaped first shaft supporting portion 60B, the pressing member such as a pressing spring in a substantially convex shape not shown is fit in the substantially U-shaped first shaft supporting portion 60B to which the substantially round bar-shaped first-direction drive turning shaft 10A is assembled and, thereafter, a thermosetting adhesive not shown having excellent adhesiveness such as epoxy resin is used to fix the pressing member not shown to the second-direction drive main body member 60. As a result, the pressing member not shown is certainly attached to the second-direction drive main body member 60.

The first-direction drive main body member 10 (FIG. 3) includes the first-direction drive turning shaft 11A capable of turning the first-direction drive assembly 1. The first-direction drive turning shaft 10A capable of turning the first-direction drive assembly 1 is mounted on the main body 18 of the first-direction drive main body member 10 so as to be projected from the both upper and lower surface portions 11 and 12 of the first-direction drive main body member 10 toward the outside of the first-direction drive main body member 10 for example in such a way as to penetrate the first-direction drive main body member 10. The gravity center portion 1A of the first-direction drive assembly 1 substantially coincides with the center portion 10F between the both end portions 11E and 12E of the first-direction drive turning shaft 11A, on the center axis 10C of the first-direction drive turning shaft 10A.

This improves the response characteristics of the laser radar driving apparatus 200 when the first-direction drive assembly 1 is turned substantially in the first direction D1. Since the gravity center portion 1A of the first-direction drive assembly 1 configured with mounting the optical member 6 and the first-direction drive coil 20 on the first-direction drive main body member 10 substantially coincides with the center portion 10F between the both end portions 11E and 12E of the first-direction drive turning shaft 10A on the center axis 10C of the first-direction drive turning shaft 10A of the first-direction drive main body member 10 capable of turning the first-direction drive assembly 1, the first-direction drive assembly 1 including the optical member 6, the first-direction drive coil 20, and the first-direction drive main body member 10 is smoothly turned around the first-direction drive turning shaft 10A of the first-direction drive main body member 10 substantially in the first direction D1.

As described above, this friction support type laser radar driving apparatus 200 (FIGS. 1, 2, 6, and 7) includes the frame yoke 100 capable of holding the second-direction drive assembly 2 to which the first-direction drive assembly 1 is rotatably assembled. The second-direction drive main body member 60 (FIG. 4) includes the second-direction drive slide turning shaft 60A capable of turning the second-direction drive assembly 2. The substantially round bar-shaped second-direction drive slide turning shaft 60A capable of turning the second-direction drive assembly 2 is projected from the main body 68 of the second-direction drive main body member 60. The frame yoke 100 (FIG. 5) includes a second slide shaft supporting portion 110B corresponding to the second-direction drive slide turning shaft 60A. The substantially U-shaped radial-bearing type second slide shaft supporting portion 110B is recessed in the both sidewall portions 101 and 102 of the frame yoke 100 correspondingly to the substantially round bar-shaped second-direction drive slide turning shaft 60A to which a radial load is applied.

If the friction support type laser radar driving apparatus 200 is configured as above, the response characteristics of the laser radar driving apparatus 200 are easily improved when the second-direction drive assembly 2 is turned substantially in the second direction D2. Since the substantially U-shaped radial-bearing type second slide shaft supporting portion 110B recessed in the both sidewall portions 101 and 102 of the frame yoke 100 is combined with the substantially round bar-shaped second-direction drive slide turning shaft 60A, which is protruded from the main body 68 of the second-direction drive main body member 60 and capable of turning the second-direction drive assembly 2 with the radial load being applied, the second-direction drive assembly 2 to which the first-direction drive assembly 1 rotatably assembled to is certainly and easily turned around the second-direction drive slide turning shaft 60A of the second-direction drive main body member 60 substantially in the second direction D2.

Since the substantially U-shaped second slide shaft supporting portion 110B corresponding to the substantially round bar-shaped second-direction drive slide turning shaft 60A is recessed in the both sidewall portions 101 and 102 of the frame yoke 100, the apparatus assembly operation is easily and quickly performed when the second-direction drive main body member 60 making up the second-direction drive assembly 2 is assembled to the frame yoke 100. This laser radar driving apparatus 200 is considered to have excellent assembly performance.

The both end portions 61E and 62E of the substantially round bar-shaped slide turning shaft 60A for driving in the second direction D2 substantially corresponding to the radial load are provided with substantially circular plate-shaped thrust-slide-bearing type axial-direction positioning portions 61D and 62D that prevent the position of the second-direction drive assembly 2 from being considerably displaced substantially in the axial direction D60 of the second-direction drive slide turning shaft 60A (FIG. 4) relative to the frame yoke 100 (FIG. 5). The substantially circular plate-shaped thrust-slide-bearing type first positioning portion 61D is disposed on the first end portion 61E of the second-direction drive turning shaft 60A, and the substantially circular plate-shaped thrust-slide-bearing type second positioning portion 62D is disposed on the second end portion 62E of the second-direction drive turning shaft 60A.

Therefore, the second-direction drive assembly 2 making up the laser radar driving apparatus 200 is certainly turned in a reciprocating manner substantially in the second direction D2. Since the both end portions 61E and 62E of the substantially round bar-shaped slide turning shaft 60A for driving in the second direction D2 substantially corresponding to the radial load are provided with substantially circular plate-shaped thrust-slide-bearing type axial-direction positioning portions 61D and 62D that prevent the position of the second-direction drive assembly 2 from being considerably displaced from the frame yoke 100 substantially in the axial direction D60 of the second-direction drive slide turning shaft 60A, when the second-direction drive assembly 2 is reciprocatingly turned relative to the frame yoke 100, the considerable displacement of the second-direction drive assembly 2 relative to the frame yoke 100 does not occur. The second-direction drive assembly 2 is accurately turned in a reciprocating manner substantially in the second direction D2 relative to the frame yoke 100.

The second-direction drive main body member 60 (FIG. 4) includes a pair of the left and right shaft portions 61A and 62A. The left shaft portion 61A is protruded from the left side surface 63 of the substantially rectangle box-shaped main body 68 making up the second-direction drive main body member 60. The right shaft portion 62A is protruded from the right side surface 64 of the substantially rectangle box-shaped main body 68 making up the second-direction drive main body member 60. The frame yoke 100 (FIG. 5) includes a pair of left and right bearing portions 111B and 112B (FIG. 5) in slidable contact with the pair of the left and right shaft portions 61A and 62A of the second-direction drive main body member 60 (FIG. 4). The left bearing portion 111B is recessed in the left sidewall portion 101 making up the frame yoke 100. The right bearing portion 112B is recessed in the right sidewall portion 102 making up the frame yoke 100.

The first shaft portion 61A of the second-direction drive turning shaft 60A protruded from the main body 68 of the second-direction drive main body member 60 (FIG. 4) is assembled to the first bearing portion 111B of the second shaft supporting portion 110B formed in the first sidewall portion 101 of the frame yoke 100 and the second shaft portion 62A of the second-direction drive turning shaft 60A protruded from the main body 68 of the second-direction drive main body member 60 (FIG. 4) is assembled to the second bearing portion 112B of the second shaft supporting portion 110B formed in the second sidewall portion 102 of the frame yoke 100 (FIG. 5) so that the second-direction drive main body member 60 (FIG. 4) on the frame yoke 100 (FIG. 5) is mounted (FIG. 1).

The first shaft portion 61A of the second-direction drive turning shaft 60A of the second-direction drive main body member 60 (FIG. 4) is positioned in a non-contact state (FIG. 7) between the first second-direction drive magnet 81A and the second second-direction drive magnet 81B mounted on the first side inner surface portion 101A of the frame yoke 100 (FIG. 5). The second shaft portion 62A of the second-direction drive turning shaft 60A of the second-direction drive main body member 60 (FIG. 4) is positioned in a non-contact state (FIG. 7) between the third second-direction drive magnet 82A and the fourth second-direction drive magnet 82B mounted on the second side inner side surface portion 102A of the frame yoke 100 (FIG. 5).

Due to the substantially circular plate-shaped positioning portions 61D and 62D, which are disposed on the both end portions 61E and 62E of the second-direction drive turning shaft 60A (FIG. 4) and have a greater diameter than the substantially round bar-shaped shaft portions 61A and 62A, the frame yoke 100 (FIG. 5) is easily provided in an aligned state with the second-direction drive main body member 60 (FIG. 4).

The second-direction drive turning shaft 60A of the second-direction drive main body member 60 (FIG. 4) includes a pair of the left and right axial-direction positioning portions 61D and 62D. The left axial-direction positioning portion 61D is disposed on the left end portion 61E of the left shaft portion 61A of the second-direction drive turning shaft 60A. The right axial-direction positioning unit 62D is disposed on the right end portion 62E of the right shaft portion 62A of the second-direction drive turning shaft 60A. The frame yoke 100 (FIG. 5) includes a pair of the left and right sidewall portions 101 and 102 (FIG. 5) in slidable contact with a pair of the left and right axial-direction positioning portions 61D and 62D of the second-direction drive turning shaft 60A (FIG. 4). The left sidewall portion 101 of the frame yoke 100 is in slidable contact (FIGS. 6 and 7) with the left axial-direction positioning portion 61D disposed on the left end portion 61E of the left shaft portion 61A of the second-direction drive turning shaft 60A (FIG. 4). The right sidewall portion 102 of the frame yoke 100 (FIG. 5) is in slidable contact (FIGS. 1, 6, and 7) with the right axial-direction positioning portion 62D disposed on the right end portion 62E of the right shaft portion 62A of the second-direction drive turning shaft 60A (FIG. 4).

After the frame yoke 100 is provided with the second-direction drive main body member 60, the first shaft portion 61A of the second-direction drive turning shaft 60A protruded from the main body 68 of the second-direction drive main body member 60 is pressed by the first pressing member 91 and the second shaft portion 62A of the second-direction drive turning shaft 60A protruded from the main body 68 of the second-direction drive main body member 60 is pressed by the second pressing member 92 so that the second-direction drive main body member 60 is certainly assembled to the frame yoke 100.

The second-direction drive main body member 60 (FIG. 4) includes the second-direction drive turning shaft 60A capable of turning the second-direction drive assembly 2. The second-direction drive turning shaft 60A capable of turning the second-direction drive assembly 2 is projected, for example, from the both left and right side surfaces 63 and 64 of the second-direction drive main body member 60 toward the outside of the second-direction drive main body member 60. The two-direction drive assembly 4 is configured with rotatably assembling the first-direction drive assembly 1 to the second-direction drive assembly 2. The gravity center portion 4A of the two-direction drive assembly 4 substantially coincides with the center portion 60F between the both end portions 61E and 62E of the second-direction drive turning shaft 60A, on the center axis 60C of the second-direction drive turning shaft 60A.

This makes the response characteristics of the laser radar driving apparatus 200 easily improved when the second-direction drive assembly 2 is turned substantially in the second direction D2. The two-direction drive assembly 4 is configured with rotatably assembling the first-direction drive assembly 1 configured with mounting the optical member 6 and the first-direction drive coil 20 on the first-direction drive main body member 10 to the second-direction drive assembly 2 configured with mounting the second-direction drive coil 70 on the second-direction drive main body member 60. Since the gravity center portion 4A of the second-direction drive assembly 4 substantially coincides with the center portion 60F between the both end portions 61E and 62E of the second-direction drive turning shaft 60A on the center axis 60C of the second-direction drive turning shaft 60A of the second-direction drive main body member 60 capable of turning the second-direction drive assembly 2, the two-direction drive assembly 4 including the first-direction drive assembly 1 and the second-direction drive assembly 2 becomes easy to be turned smoothly around the second-direction drive turning shaft 60A of the second-direction drive main body member 60 substantially in the second direction D2.

In accordance with the design/specification of the laser radar driving apparatus, for example, there can be used a laser radar driving apparatus which has the gravity center portion (1A) of the first-direction drive assembly 1 shown in FIG. 3 substantially identical to the gravity center portion (4A) of the two-direction drive assembly (4) including the first-direction drive assembly (1) and the second-direction drive assembly (2) shown in FIG. 4.

The first-direction drive assembly 1 (FIG. 3) is set for a total weight lighter than that of the second-direction drive assembly 2 (FIG. 4).

This improves the response characteristics substantially in the lateral turn direction D1 of the first-direction drive assembly 1 of the laser radar driving apparatus 200. For example, in the case of the laser radar driving apparatus 200 where the laser beam drive characteristics in the first direction D1 defined as the lateral turn direction D1 is regarded as important, it is determined that a laser radar driving apparatus with excellent laser beam drive characteristics in the first direction D1 defined as the lateral turn direction D1 has higher performance than one with excellent laser beam drive characteristics in the second direction D2 defined as the longitudinal turn direction D2. Since the first-direction drive assembly 1 is lighter in total weight than the second-direction drive assembly 2, the first-direction drive assembly 1 at the time of turning the first-direction drive assembly 1 becomes smaller in moment than the second-direction drive assembly 2 at the time of turning the second-direction drive assembly 2, and the first-direction drive assembly 1 is easily turned. Therefore, there is configured the laser radar driving apparatus 200 with the improved response characteristics in the lateral turn direction D1.

The first-direction drive assembly 1 (FIG. 3) is intended to be smaller in whole size than the second-direction drive assembly 2 (FIG. 4).

This improves the response characteristics substantially in the lateral turn direction D1 of the first-direction drive assembly 1 of the laser radar driving apparatus 200. In accordance with the design/specification of the laser radar driving apparatus 200, in some of the laser radar driving apparatus 200, the laser beam drive characteristics in the first direction D1 defined as the lateral turn direction D1 is regarded as important, for example. In the case of such a laser radar driving apparatus 200, it is determined that a laser radar driving apparatus with excellent laser beam drive characteristics in the first direction D1 defined as the lateral turn direction D1 has higher performance than one with excellent laser beam drive characteristics in the second direction D2 defined as the longitudinal turn direction D2. Since the first-direction drive assembly 1 is configured to be smaller in whole size than the second-direction drive assembly 2, the first-direction drive assembly 1 at the time of turning the first-direction drive assembly 1 becomes smaller in moment than the second-direction drive assembly 2 at the time of turning the second-direction drive assembly 2, and the first-direction drive assembly 1 is easily turned. Therefore, there is configured the laser radar driving apparatus 200 with the improved response characteristics in the lateral turn direction D1.

Since the laser beam drive characteristics in the first direction D1 defined as the lateral turn direction D1 is regarded as important in this laser radar driving apparatus 200, a small size is considered to be sufficient for the first-direction drive coil 20 making up the first-direction drive assembly 1 so that the movement is facilitated. Since in this laser radar driving apparatus 200, the two-direction drive assembly 4 including the first-direction drive assembly 1 and the second-direction drive assembly 2 is required to be moved substantially in the second direction D2 defined as the longitudinal turn direction D2, the second-direction drive coil 70 must be larger than the first-direction drive coil 20.

When the first-direction drive assembly 1 (FIG. 7) is viewed from the front, the first-direction drive assembly 1 (FIGS. 3 and 7) is substantially laterally symmetrically configured.

Therefore, the first-direction drive assembly 1 is turned substantially in the lateral turn direction D1 in a well-balanced manner. Since the first-direction drive assembly 1 is substantially laterally symmetrically configured in the front view, when the first-direction drive assembly 1 is moved substantially in the lateral turn direction D1, the first-direction drive assembly 1 is turned in substantially the same smooth manner, in either of the left turn direction D1*a* or the right turn direction D1*b*.

When the first-direction drive assembly 1 (FIG. 7) is viewed from the front, the first-direction drive assembly 1 (FIGS. 3 and 7) is substantially longitudinally symmetrically configured.

Therefore, the second-direction drive assembly 2 to which the first-direction drive assembly 1 rotatably assembled is turned substantially in the longitudinal turn direction D2 in a well-balanced manner. Since the first-direction drive assembly 1 rotatably assembled to the second-direction drive assembly 2 is substantially longitudinally symmetrically configured in the front view, when the second-direction drive assembly 2 including the first-direction drive assembly 1 is moved substantially in the longitudinal turn direction D2, the second-direction drive assembly 2 including the first-direction drive assembly 1 is turned in substantially the same smooth manner, in either of the upward turn direction D2*a* or the downward turn direction D2*b*.

When the second-direction drive assembly 2 (FIG. 7) is viewed from the front, the second-direction drive assembly 2 (FIGS. 4 and 7) is substantially longitudinally symmetrically configured.

Therefore, the second-direction drive assembly 2 including the substantially longitudinally symmetrically configured first-direction drive assembly 1 is turned substantially in the longitudinal turn direction D2 in a well-balanced manner. Since the second-direction drive assembly 2 including the substantially longitudinally symmetrically configured first-direction drive assembly 1 is substantially longitudinally symmetrically configured in the front view, when the second-direction drive assembly 2 including the substantially longitudinally symmetrically configured first-direction drive assembly 1 is moved substantially in the longitudinal turn direction D2, the second-direction drive assembly 2 including the substantially longitudinally symmetrically configured first-direction drive assembly 1 is turned in substantially the same smooth manner in either of the upward turn direction D2a or the downward turn direction D2b.

The two-direction drive assembly 4 is configured with rotatably assembling the first-direction drive assembly 1 to the second-direction drive assembly 2 (FIGS. 4 and 7), and when the two-direction drive assembly 4 (FIG. 7) is viewed from the front, the two-direction drive assembly 4 (FIGS. 4 and 7) is substantially laterally symmetrically configured and substantially longitudinally symmetrically configured.

Therefore, the first-direction drive assembly 1 making up the two-direction drive assembly 4 is turned substantially in the lateral turn direction D1 in a well-balanced manner. The two-direction drive assembly 4 configured with rotatably assembling the first-direction drive assembly 1 to the second-direction drive assembly 2 is turned substantially in the longitudinal turn direction D2 in a well-balanced manner. The first-direction drive assembly 1 is substantially laterally symmetrically configured in the front view and substantially longitudinally symmetrically configured in the front view. As is the case with the first-direction drive assembly 1, the second-direction drive assembly 2 is substantially laterally symmetrically configured in the front view and substantially longitudinally symmetrically configured in the front view. Since the first-direction drive assembly 1 configured substantially laterally symmetrically in the front view as well as substantially longitudinally symmetrically in the front view is rotatably assembled to the second-direction drive assembly 2 configured substantially laterally symmetrically in the front view as well as substantially longitudinally symmetrically in the front view, the two-direction drive assembly 4 including the first-direction drive assembly 1 and the second-direction drive assembly 2 is substantially laterally symmetrically configured in the front view as well as substantially longitudinally symmetrically configured in the front view.

Since the two-direction drive assembly 4 is substantially laterally symmetrically configured in the front view and substantially longitudinally symmetrically configured in the front view, when the first-direction drive assembly 1 rotatably assembled to the second-direction drive assembly 2 configuring the two-direction drive assembly 4 is moved substantially in the lateral turn direction D1, the first-direction drive assembly 1 making up the two-direction drive assembly 4 is turned in substantially the same smooth manner in either of the left turn direction D1a or the right turn direction D1b. Since the two-direction drive assembly 4 is substantially laterally symmetrically configured in the front view and substantially longitudinally symmetrically configured in the front view, when the two-direction drive assembly 4 configured with rotatably assembling the first-direction drive assembly 1 to the second-direction drive assembly 2 is moved substantially in the longitudinal turn direction D2, the two-direction drive assembly 4 including the first-direction drive assembly 1 and the second-direction drive assembly 2 is turned in substantially the same smooth manner, in either of the upward turn direction D2a or the downward turn direction D2b.

The first direction D1 is defined as the pan direction D1 when the first-direction drive assembly 1 (FIG. 3) is moved around the first-direction drive turning shaft 10A of the first-direction drive main body member 10 substantially in the lateral turn direction D1. The first-direction drive assembly 1 of the friction support type laser radar driving apparatus 200 is quickly moved around the first-direction drive turning shaft 10A of the first-direction drive main body member 10 substantially in the pan direction D1 defined as the lateral turn direction D1.

The second direction D2 is defined as the tilt direction D2 when the second-direction drive assembly 2 (FIG. 4) is moved around the second-direction drive turning shaft 60A of the second-direction drive main body member 60 substantially in the longitudinal turn direction D2. The second-direction drive assembly 2 including the first-direction drive assembly 1 of the friction support type laser radar driving apparatus 200 is quickly moved around the second-direction drive turning shaft 60A of the second-direction drive main body member 60 substantially in the tilt direction D2 defined as the longitudinal turn direction D2.

Material containing light metal such as aluminum material or aluminum alloy material is used to form a wire making up either the first-direction drive coil 20 (FIG. 5) or the second-direction drive coil 70, or both the coils. A coil wire including light metal such as aluminum material or aluminum alloy material includes, for example, the enamel copper-clad aluminum wire manufactured by the Totoku Electric Co., Ltd., etc.

A conducting wire with an insulating coating material is used to make up either the pan-direction drive coil 20 or the tilt-direction drive coil 70, or both the coils. Specifically, a copper-clad aluminum wire is used which can facilitate weight reduction, and the fusible enamel CCAW formed by coating this copper-clad aluminum wire with insulating material such as enamel material is used to make up either the pan-direction drive coil 20 or the tilt-direction drive coil 70, or both the coils. The copper-clad aluminum wire is abbreviated as CCAW. The fusible enamel CCAW includes aluminum material or aluminum alloy material making up a conducting wire main body, copper material making up an outer layer of the conducting wire main body, and the insulating material and/or fusion material such as enamel material making up a circumferential portion of the copper material. The coat formed from the insulating material is formed by using a polyurethane resin, a class B soldered enamel resin, and a soldered polyester-imide resin, for example. The coat of the fusion material is formed from an alcohol soluble resin and a hot-air bonding resin, for example.

The CCAW is a magnet wire configured as a compound light weight material. Since the CCAW main body is configured with the aluminum or aluminum alloy material at the center portion of the cross-section of the CCAW, the weight of the conducting wire can be reduced. For example, if the CCAW with the same wire diameter as a copper wire, the weight of the CCAW is about one third of that of the copper wire. Since a layer of a copper material is configured around the aluminum or aluminum alloy material making up the center portion of the cross-section of the CCAW, the CCAW is considered to be excellent in solderability and corrosion resistance. The CCAW includes, for example, the one with a conductive main body formed from aluminum and, for example, HCCAW (High-Tension Copper-Clad Aluminum wire) with a conducting wire main body made of aluminum alloy, and UCCAW (Ultra High-Tension Copper-Clad Aluminum wire) with a conducting wire main body made of aluminum alloy. For example, the specific gravity of CCAW, HCCAW, and UCCAW is about 3 to 3.7.

If the material containing light metal such as aluminum material or aluminum alloy material is used to form a wire configuring either the first-direction drive coil 20 or the second-direction drive coil 70, or both coils, the response characteristics of the laser radar driving apparatus 200 are improved. The material containing light metal such as aluminum material or aluminum alloy material has a specific gravity smaller than other metal materials, for example, and is suitable for weight reduction. For example, while the specific gravity of iron is about 7.85 to 7.87 and the specific gravity of copper is about 8.92 to 8.95, the specific gravity of aluminum is about 2.71. The specific gravity of aluminum is about one third of that of iron or copper, for example. If the material containing light metal such as aluminum material or aluminum alloy material is used to form a wire configuring the first-direction drive coil 20 and the second-direction drive coil 70, the weights of the first-direction drive coil 20 and the second-direction drive coil 70 can be reduced.

Since the material containing light metal is used to form the wire making up the first-direction drive coil 20, the weights of the first-direction drive assembly 1 including the first-direction drive coil 20 can be reduced and, as a result, the first-direction drive assembly 1 is easily moved. If the first-direction drive assembly 1 with reduced weight is mounted on the second-direction drive assembly 2, the second-direction drive assembly 2 including the first-direction drive assembly 1 is easily moved. Since the material containing light metal is used to form the wire making up the second-direction drive coil 70, the weights of the second-direction drive assembly 2 including the second-direction drive coil 70 can be reduced and, as a result, the second-direction drive assembly 2 is easily moved. Since the first-direction drive assembly 1 and the second-direction drive assembly 2 have reduced their weights so as to be easily moved, the response characteristics of the laser radar driving apparatus 200 including the first-direction drive assembly 1 and the second-direction drive assembly 2 are improved.

In accordance with the design/specification of the laser radar driving apparatus 200, for example, another form of coils (not shown) may be used instead of the coils 20 and 70 shown in FIG. 5. For example, the coil (20, 70) may be a coil formed by executing a plating process of circuit conductors on a substrate including a glass layer, a resin layer such as an epoxy resin layer (all not shown), etc. For example, a print coil may be used for the coil. Such a coil includes, for example, the FP coil (registered trademark) manufactured by Asahi Kasei EMD Corporation.

Since such a coil (20) is used, the coil (20) is easily mounted on the first-direction drive main body member (10). Since the coil (20) formed by executing a plating process of circuit conductors on a substrate is used, the mounting operation of the coil (20) on the first-direction drive main body member (10) is easily performed. Since the mounting operation of the coil (20) on the first-direction drive main body member (10) is easily performed, the assembly operation of the laser radar driving apparatus (200) is easily performed. Since the assembly operation of the laser radar driving apparatus (200) is easily performed, the price of the laser radar driving apparatus (200) can be reduced.

An injection-moldable thermoplastic heat-resistant synthetic resin material is used to form the first-direction drive main body member 10 integrally including the substantially rectangle box-shaped main body 18 (FIG. 3), the substantially round bar-shaped first-direction turning shaft 10A, the substantially circular plate-shaped member mounting unit 16, and the projected-shaped coil mounting unit 17. An injection-moldable thermoplastic heat-resistant synthetic resin material is used to form the second-direction drive main body member 60 integrally including the substantially rectangle box-shaped main body 68 (FIG. 4), the substantially round bar-shaped second-direction drive turning shaft 60A, and the groove and plate/wall-shaped coil mounting unit 67.

Specifically, the pan main body member 10 and/or the tilt main body member 60 (FIG. 4) are formed from, for example, a ketone resin, such as a polyether ether ketone resin, excellent in sliding characteristics such as wear resistance, in strength characteristics, in heat resistance at the time of soldering, etc., and in injection moldability, and capable of achieving lighter weight than iron material. The ketone resin includes a polyether ether ketone resin and a polyaryl ether ketone resin, for example. The polyether ether ketone is abbreviated as PEEK (registered trademark), for example. The polyaryl ether ketone resin is abbreviated as PAEK, for example. The PEEK material includes "VICTREX (registered trademark) PEEK (registered trademark)" manufactured by victrex plc., UK and available from Victrex-MC, Inc., for example. Products of the VICTREX (registered trademark) include "VICTREX PEEK 450G", for example.

The pan main body member 10 and/or the tilt main body member 60 are formed from, for example, a liquid crystal polymer (LCP) excellent in thin-wall moldability, in heat resistance at the time of soldering, etc., and in injection moldability, and capable of achieving lighter weight than iron material. The type I liquid crystal polymer excellent in heat resistance includes Sumika Super (registered trademark) manufactured by Sumitomo Chemical Co., Ltd., for example. Products of the Sumika Super (registered trademark) include E5008L and E6008, for example. The type I liquid crystal polymer excellent in heat resistance includes Xydar (registered trademark) manufactured by Nippon Oil Corporation, for example. Products of the Xydar (registered trademark) include 300 series, 400 series, RC and FC series, for example. Specifically, Products of the Xydar (registered trademark) include Grade M-350, Grade M-450, and Grade FC-120, for example. The type II liquid crystal polymer includes Vectra (registered trademark) manufactured by Polyplastics Co., Ltd. Products of the Vectra (registered trademark) include Grades A410 and S471, for example.

The pan main body member 10 and/or the tilt main body member 60 are formed from, for example, a poly arylene sulfide (PAS) resin such as a poly phenylene sulfide resin (PPS) excellent in heat resistance at the time of soldering, etc., in injection moldability, in electric characteristics such as insulating characteristics, mechanical characteristics, and dimension stability, and capable of achieving a lighter weight than an iron material. The PPS is used as a base material of, for example, DIC (registered trademark) manufactured by Dainippon Ink And Chemicals, Inc. Specifically, the PPS includes, for example, DIC PPS_FZ-2100 manufactured by Dainippon Ink And Chemicals, Inc.

Either the first-direction drive main body member 10 or the second-direction drive main body member 60, or both members are formed from, for example, composition including at least one or more injection-moldable thermoplastic heat-resistant synthetic resin materials selected from a group including PEEK, LCP, and PPS. In accordance with the design/specification of the laser radar driving apparatus, for example, composition including at least one or more injection-moldable thermoplastic heat-resistant synthetic resin materials selected from a group including PEEK or LCP may be used to form either the first-direction drive main body member 10 or the second-direction drive main body member 60, or both members. In accordance with the design/specification of the laser radar driving apparatus, for example, composition including at least one or more injection-moldable thermoplastic heat-resistant synthetic resin materials selected from a group including LCP or PPS may be used to form one or both of the first-direction drive main body member 10 and the second-direction drive main body member 60. In accordance with the design/specification of the laser radar driving apparatus, for example, composition including at least one or more injection-moldable thermoplastic heat-resistant synthetic resin materials selected from a group including PPS or PEEK may be used to form either the first-direction drive main body member 10 or the second-direction drive main body member 60, or both members.

If the injection-moldable thermoplastic heat-resistant synthetic resin material is used to form the first-direction drive main body member 10 integrally including the substantially rectangle box-shaped main body 18, the substantially round bar-shaped first-direction turning shaft 10A, the substantially circular plate-shaped member mounting unit 16, and the projected-shaped coil mounting unit 17, and if the injection-moldable thermoplastic heat-resistant synthetic resin material is used to form the second-direction drive main body member 60 integrally including the substantially rectangle box-shaped main body 68, the substantially round bar-shaped second-direction drive turning shaft 60A, and the groove and plate/wall-shaped coil mounting unit 67, the response characteristics of the laser radar driving apparatus 200 are improved. The resin material has a specific gravity smaller than, for example, metal material and is suitable for weight reduction. For example, while the specific gravity of iron is about 7.85 to 7.87, the specific gravity of PEEK is about 1.3, and the specific gravity of PEEK including filler is about 1.4 to 1.55. For example, the specific gravity of LCP is about 1.27 to 1.4, and the specific gravity of LCP including filler is about 1.55 to 1.8. For example, the specific gravity of PPS is about 1.35 to 1.42, and the specific gravity of PPS including filler is about 1.57 to 2. If composition including the injection-moldable thermoplastic heat-resistant synthetic resin material is used to form the first-direction drive main body member 10 and the second-direction drive main body member 60, the weights of the first-direction drive main body member 10 and the second-direction drive main body member 60 can be reduced.

Since the synthetic resin material is used to form the first-direction drive main body member 10, the weight of the first-direction drive assembly 1 including the first-direction drive main body member 10 can be reduced and, as a result, the first-direction drive assembly 1 is easily moved. If the first-direction drive assembly 1 with reduced weight is mounted on the second-direction drive assembly 2, the second-direction drive assembly 2 including the first-direction drive assembly 1 is easily moved. Since the synthetic resin material is used to form the second-direction drive main body member 60, the weight of the second-direction drive assembly 2 including the second-direction drive main body member 60 can be reduced and, as a result, the second-direction drive assembly 2 is easily moved. Since the first-direction drive assembly 1 and the second-direction drive assembly 2 have reduced in weight and are easily moved, the response characteristics of the laser radar driving apparatus 200 including the first-direction drive assembly 1 and the second-direction drive assembly 2 are improved.

Injection-moldable thermoplastic heat-resistant synthetic resin material is used to form a substrate 6D of the optical member 6 (FIGS. 1 to 4, 6, and 7).

Specifically, the substrate 6D of the optical member 6 is formed from, for example, acrylic/methacrylic resins, with high transparence, excellent in weather resistance, mirror-like smoothness, thickness accuracy, etc. The formal name of the methacrylic resin is polymethyl methacrylate, and polymethyl methacrylate is abbreviated as PMMA. The mathacrylic resin is also referred to as the acrylic resin. The substrate 6D of the optical member 6 is formed from, for example, a polycarbonate resin excellent in processability, etc., and capable of achieving a lower price. Polycarbonate is abbreviated as PC, for example. Specifically describing a method of manufacturing the optical member 6, for example, vacuum deposition of metal such as aluminum is performed on a rear surface portion 6B of the acrylic/polycarbonate-resin substrate 6D and a metal film 6C of aluminum, etc., is formed to make up the optical member 6 that substantially totally reflects light.

If the injection-moldable thermoplastic heat-resistant synthetic resin material is used to form the substrate 6D of the optical member 6, the response characteristics of the laser radar driving apparatus 200 are improved. The resin material has a specific gravity smaller than, for example, metal material and is suitable for weight reduction. For example, while the specific gravity of copper is about 8.92 to 8.95; the specific gravity of glass is about 2.2 to 2.8; and the specific gravity of lead glass is about 3.4 to 4.28, the specific gravity of PMMA is about 1.16 to 1.2. For example, the specific gravity of PC is about 1.2, and the specific gravity of PC including filler is about 1.4 to 1.43. If the injection-moldable thermoplastic heat-resistant synthetic resin material is used to form the substrate 6D of the optical member 6, the weight of the optical member 6 can be reduced. Since the synthetic resin material is used to form the substrate 6D of the optical member 6, the weight of the first-direction drive assembly 1 including the optical member 6 can be reduced and, as a result, the first-direction drive assembly 1 is easily moved. Since the first-direction drive assembly 1 has reduced in weight and is easily moved, the response characteristics of the laser radar driving apparatus 200 including the first-direction drive assembly 1 are improved.

If the first-direction drive assembly 1 with reduced weight is mounted on the second-direction drive assembly 2, the second-direction drive assembly 2 including the first-direction drive assembly 1 is easily moved and, as a result, the response characteristics of the laser radar driving apparatus 200 are improved.

The parts making up the laser radar driving apparatus 200 such as the first-direction drive main body member 10, the second-direction drive main body member 60, and the substrate 6D of the optical member 6 are formed from thermoplastic heat-resistant synthetic resin material with excellent moldability based on an injection molding method with excellent mass-producibility. If the parts making up the laser radar driving apparatus 200 such as the first-direction drive main body member 10, the second-direction drive main body member 60, and the optical member 6 are formed based on the injection molding method, these parts can be mass-produced with efficiency even if these parts have complicated shapes.

The parts making up the laser radar driving apparatus 200 such as the first-direction drive main body member 10, the second-direction drive main body member 60, and the substrate 6D of the optical member 6 are formed from composition including injection-moldable thermoplastic heat-resistant synthetic resin material with a specific gravity of about 0.8 or greater and about 2 or less, specifically, a specific gravity of about 0.83 or greater and about 1.98 or less, for example.

If the parts making up the laser radar driving apparatus 200 such as the first-direction drive main body member 10, the second-direction drive main body member 60, and the substrate 6D of the optical member 6 are formed from composition including injection-moldable thermoplastic heat-resistant synthetic resin material with a specific gravity of about 2 or less, the weight of the laser radar driving apparatus 200 can be reduced. Since the weights of the parts such as the first-direction drive main body member 10, the second-direction drive main body member 60, and the substrate 6D of the optical member 6 are reduced, the laser radar driving apparatus 200 is configured with improved response characteristics.

For example, the composition including an injection-moldable thermoplastic heat-resistant synthetic resin material with a specific gravity of near about 2 includes the PPS including a large amount of filler, for example. The PPS including filler with a specific gravity of near about 2 includes Fortron (registered trademark) 6165A6 manufactured by Polyplastics Co., Ltd., for example. The specific gravity of the Fortron (registered trademark) 6165A6 is about 1.98.

Among the injection-moldable thermoplastic heat-resistant synthetic resin materials, the specific gravity of the lightest synthetic resin material/composition is generally considered to be on the order of about 0.8, for example. The injection-moldable thermoplastic heat-resistant synthetic resin material/composition with a specific gravity of near about 0.8 includes, for example, polymethylpentene with excellent transparency and heat resistance. For example, the specific gravity of polymethylpentene is about 0.83 to 0.84. Polymethylpentene includes TPX (registered trademark) RT31 manufactured by Mitsui Chemical Inc., for example. "TPX" is an abbreviation of "Transparent Polymer X".

In accordance with the design/specification of the laser radar driving apparatus 200, for example, the optical member 6 (FIGS. 1 to 4, 6, and 7) formed from a glass material such as lead glass and optical glass can be used. By using the optical member 6 made of a glass material such as lead glass and optical glass, a balance is easily achieved in the two-direction drive assembly 4 configured with mounting the first-direction drive assembly 1 including the optical member 6 on the second-direction drive assembly 2, for example.

For the optical member 6 (FIGS. 1 to 4, 6, and 7), there is used the mirror 6 that: reflects a laser beam, which is radiated from the light emitting element not shown and is emitted into the substantially transparent substrate 6D (FIGS. 1, 3, 4, and 6) from the surface portion 6A thereof, to be applied to the metal film 6C of the rear surface portion 6B of the substrate 6D; and is emitted from the surface portion 6A. For example, the mirror 6 is configured with forming the metal film 6C, etc., such as a silver film and a copper film on the rear surface portion 6B (FIGS. 3 and 6) of the optical substrate 6D. The surface portion 6A of the optical substrate 6D making up the mirror 6 is formed as a smooth surface. The laser radar driving apparatus 200 (FIGS. 1, 2, 6, and 7) is configured as a mirror rotation type laser radar emitting module 200. A module means a structural unit formed by combining a plurality of parts for facilitating addition and replacement, for example.

Since the mirror 6 is mounted on the friction support type laser radar emitting module 200 with the above configuration, the response characteristics of the mirror 6 of the laser radar emitting module 200 are easily improved. When the mirror 6 is turned, the emission angle of the laser beam is substantially doubled and the wobbling angle of the mirror 6 is reduced.

The laser beam radiating from the light emitting diode: is emitted into the substrate 6D of the mirror 6 from the surface portion 6A of the substrate 6D of the mirror 6; is reflected by the metal film 6C configured as a plurality of layers of the rear surface portion 6B of the substrate 6D of the mirror 6; is emitted from the surface portion 6A of the mirror 6, and is then applied to a target object. The laser beam reflected and returned from the target object is detected by the laser radar to measure a distance between the laser radar and the target object.

A mirror including an aluminum film, etc., formed by vacuum deposition of aluminum, etc., on an acrylic resin substrate includes, for example, AKURI Mirror (registered trademark) manufactured by Ryoko Co., Ltd. Specific product names of the AKURI Mirror (registered trademark) include AKURI Mirror S: product No. M-001 (2 mm in thickness) and AKURI Mirror MS: product No. MS-001 (2 mm in thickness), for example.

A mirror including an aluminum film, etc., formed by vacuum deposition of aluminum, etc., on a polycarbonate resin substrate includes, for example, PC Mirror (registered trademark) manufactured by Ryoko Co., Ltd. Specific product names of the PC Mirror include PC Mirror: product No. PC-001 (0.5 mm in thickness, adhesive), for example.

With regard to a glass mirror configured by: forming a silver film on a back surface of a float glass through coating of silver with excellent reflectivity; forming a copper film which prevents oxidation of the silver film on the silver film; and forming a protective film with cladding the copper film with coating material which protects a metal film such as a silver film or a copper film, the glass mirror includes, for example, Hi-Mirror (registered trademark), Hi-Mirror DXII (registered trademark) and Hi-Mirror E manufactured by Nippon Sheet Glass Co., Ltd. Specific product types of the Hi-Mirror include, for example, "Hi-Mirror Clear" with a nominal thickness of 5 mm. Specific product types of the Hi-Mirror DXII include, for example, "Hi-Mirror DXII Clear" with a nominal thickness of 5 mm. The mirror 6 formed from the Hi-Mirror DXII is the mirror 6 with the silver film, etc., completely protected, since a special film is formed on a circumferential edge 6E (FIG. 3) of the mirror 6. Since the silver film, etc., are completely protected, the durability and the weather resistance of the mirror 6 are improved.

For example, magnet steel, which includes iron, chromium, cobalt, etc. and is processable in a forming process such as a rolling process, is used to form the metal magnets 31, 32 (FIGS. 1, 2, 6, and 7), 81A, 81B, 82A, 82B (FIGS. 5 and 7). The metal magnets include, for example, CKSC (registered trademark) manufactured by NEOMAX Co., Ltd., or CKSR (registered trademark) manufactured by NEOMAX Co., Ltd. Specific materials of the metal magnets include, for example, CKSC-600 manufactured by NEOMAX Co., Ltd., or CKSR-200 manufactured by NEOMAX Co., Ltd.

For example, a metal material plate consisting primarily of iron is used to form the frame yoke 100 (FIG. 5) in a substantially U-shape in a plan view, for example, through punching/bending with a press forming machine. The metal material plate consisting primarily of iron includes a stainless steel plate, a rolled steel plate, and a steel strip. For example, cold-rolled steel plate and steel strip include SPCC, SPCD, and SPCE, which is specified based on "JIS G3141".

For example, a metal material plate consisting primarily of copper is used to form the retaining springs 91 and 92 (FIG. 1), for example, in a substantially flat plate shape through punching by a press forming machine. It is preferable that, for example, a copper alloy including about 3.5% to 9% of tin (Sn) and about 0.03% to 0.5% of phosphorous (P) is used as a metal material consisting primarily of copper (Cu). Specifically, it is preferable that, for example, "phosphor bronze for spring" with excellent strength, spring characteristics, wear resistance, corrosion resistance, etc is used as the copper alloy consisting primarily of copper (Cu) and including about 7% to 9% of tin (Sn) and about 0.03% to 0.35% of phosphorous (P). The phosphor bronze plate material for spring includes, for example, C5210 (C5210P) and C5212 (C5212P) specified based on "JIS H3130".

A non-servo stepping drive test was performed for the friction support type laser radar driving apparatus 200 (FIGS. 1, 2, 6, and 7). A test was performed for two types of the laser radar driving apparatus with a mirror turning actuator, which are the friction support type laser radar driving apparatus and the suspension support type laser radar driving apparatus.

Stepwise currents were applied to the coils 20 and 70 (FIG. 5) to perform a turning test of the mirror 6 (FIGS. 1, 2, 6, and 7). For lateral scanning, 23 steps were performed 10 times. The stepping drive was performed for 23 steps at a time in the upper side, 23 steps at a time in the center portion, and 23 steps at a time in the lower side. In this test, 23 steps were performed 10 times. It was confirmed that the stepwise step response of 1 msec or less can be obtained.

Since the above laser radar driving apparatus 200 is identified as the friction support type, for example, non-servo drive control can be achieved. Since the friction support type laser radar driving apparatus 200 configured as shown in FIGS. 1 to 7 is considered to have a configuration that is relatively resistant to vibration, it is preferable that this laser radar driving apparatus 200 is mounted to a movable mean such as an automobile.

For example, it is preferable that a laser radar apparatus including the laser radar driving apparatus 200 is connected to and used with a rear-end collision preventing and alarming apparatus, etc., which prevent an automobile provided with the laser radar apparatus from colliding with an automobile positioned ahead of the automobile provided with the laser radar apparatus (all not shown). A distance and a relative speed to the automobile in front are quickly calculated from an amount of time and a traveling speed, where the amount of time elapses: from when a laser beam is emitted from a laser radar receiving/emitting apparatus on the front side of the automobile to be applied to a rear reflecting member, etc., of the automobile in front, and reflected by the rear reflecting member thereof; to when the reflected laser beam is returned to the laser radar receiving/emitting apparatus on the front side of the automobile, and where the traveling speed being that of the automobile provided with the laser radar apparatus. For example, when the speed of the moving automobile in front is reduced relative to the traveling speed of the automobile provided with the laser radar apparatus and when it is detected that an actual measured value of the distance between the automobiles is smaller than a predetermined value of the distance between automobiles, a caution signal, a danger signal, etc., are issued to a driver through an alarm lamp, an alarm speaker, etc.

Alternatively, since a laser beam emitted from the laser radar receiving/emitting apparatus on the front side of the automobile is applied to various reflecting members provided in advance with road shoulders of sharply curved roads, school roads, and crosswalks, for example, and the reflected laser beam is returned to the laser radar receiving/emitting apparatus on the front side of the automobile, a caution signal, a danger signal, etc. are issued to a driver through an alarm lamp, an alarm speaker, etc.

The laser radar driving apparatus 200 is also mounted on a driver support system apparatus that enables an automobile provided with the laser radar apparatus to be driven with an appropriate distance maintained at all times relative to a moving automobile ahead of the automobile provided with the laser radar apparatus, for example. The driver support system apparatus includes an active cruise control apparatus, for example.

The laser radar driving apparatus 200 according to the present invention is not limited to the shown apparatus. For example, to cause the laser radar driving apparatus 200 to more certainly perform the drive control, the friction support type laser radar driving apparatus 200 may be configured with a servo function. For example, to achieve a balance of the laser radar driving apparatus 200, a balancer (not shown) may be mounted on the inner front side of the main body 18 of the first-direction drive main body member 10 making up the first-direction drive assembly 1.

As described above, the laser radar driving apparatus, according to the present embodiment, applying a laser beam to a target object and detecting the laser beam reflected and returned from the target object to measure a distance to the target object, at least comprises: an optical member that the laser beam is applied to; a main body member that the optical member is mounted to; and a coil capable of manipulating the main body member, wherein a drive assembly is configured with mounting the optical member and the coil to the main body member.

Therefore, the response characteristics of the laser radar driving apparatus are easily improved. The laser radar driving apparatus is considered to measure a distance to a target object by applying a laser beam to the target object and detecting the laser beam reflected and returned from the target object. For example, the angular acceleration when the drive assembly of this laser radar driving apparatus is turned is greater in numeric value than the angular acceleration when a drive assembly of a conventional lens shift type laser radar drive apparatus is turned. The drive assembly of this laser radar drive apparatus is smaller in size than the drive assembly of the conventional lens shift type laser radar drive apparatus and the drive assembly of the conventional suspension support type laser radar drive apparatus. The wobbling angle of the drive assembly of the laser radar drive apparatus can be set to a smaller angle. The number of coils is reduced from the number of coils in the conventional lens shift type laser radar drive apparatus and the number of coils in the conventional suspension support type laser radar drive apparatus. By reducing the number of parts, the price of the laser radar drive apparatus can be lowered.

In the laser radar driving apparatus according to the present embodiment, the main body member includes a turning shaft capable of turning the drive assembly, and a gravity center portion of the drive assembly substantially coincides with mounting a center portion on a center axis of the turning shaft.

Therefore, the response characteristics of the laser radar driving apparatus are improved. Since the gravity center portion of the drive assembly configured with mounting the optical member and the coil on the main body member substantially coincides with the center portion on the center axis of the turning shaft of the main body member, which is capable of turning the drive assemble, the drive assembly including the optical member, the coil, and the main body member becomes easy to be turned smoothly around the turning shaft of the main body member. The moment at the time of turning the drive assembly of the laser radar driving apparatus is easily obtained. Since the drive assembly is smoothly turned, the response characteristics of the laser radar driving apparatus are improved.

The laser radar driving apparatus according to the present embodiment comprises: a magnetic member corresponding to the coil; and a frame yoke that the magnetic member is fixed to, wherein when the frame yoke is provided with the drive assembly, the coil is substantially positioned in an effective magnetic field of the magnetic member.

Therefore, the response characteristics of the laser radar driving apparatus are improved. Since the coil is substantially positioned in the effective magnetic fields of the magnetic members when the drive assembly configured with mounting the optical member and the coil on the main body member is disposed on the frame yoke with the magnetic members fixed thereon, if the current is applied to the coil corresponding to the magnetic members, the drive assembly including the optical member, the coil, and the main body member is quickly turned by the electromagnetic force generated in the coil. Since the drive assembly is quickly turned, the response characteristics of the laser radar driving apparatus are improved.

In the laser radar driving apparatus according to the present embodiment, the frame yoke includes a housing unit that the drive assembly is mounted to, and the drive assembly is rotatably provided for the housing unit.

Therefore, the drive assembly is freely turned without other objects blocking the movement thereof in the housing unit of the frame yoke. The drive assembly disposed on the housing unit of the frame yoke is freely turned without interference from other objects.

The laser radar driving apparatus according to the present embodiment comprises a substantially flat-plate magnetic member corresponding to the coil, wherein the coil is configured as a substantially annular flat-plate coil, and the substantially flat-plate magnetic member is positioned on a side of one surface portion of the substantially annular flat-plate coil.

Therefore, the response characteristics of the laser radar driving apparatus are improved. Since the substantially flat-plate magnetic members are positioned on the side of one surface portion of the substantially annular flat-plate coil, when the current is applied to the substantially annular flat-plate coil, the forces are generated in the substantially annular flat-plate coil due to the magnetic field generated in the substantially flat-plate magnetic members. The current is applied to the substantially annular flat-plate coil faced with the substantially flat-plate magnetic members, and the drive assembly including the substantially annular flat-plate coil is turned by magnetic fields generated in the substantially annular flat-plate coil on this occasion.

The laser radar driving apparatus according to the present embodiment comprises a magnetic member corresponding to the coil, wherein the magnetic member is disposed for the coil, wherein the magnetic member is formed in a substantially flat-plate shape, including a positive pole portion and a negative pole portion which is opposite in polarity to the positive pole portion, wherein the coil is formed in a substantially annular flat-plate shape, including a first side portion corresponding to the positive pole portion and a second side portion, which is opposite to the first side portion, corresponding to the negative pole portion, wherein the positive pole portion is faced with the first side portion, and wherein the negative pole portion is faced with the second side portion.

Therefore, the response characteristics of the laser radar driving apparatus are improved. Since the positive pole portion of the magnetic member is faced with the first side portion of the coil, when the current is applied to the first side portion of the coil, the force is generated in the first side portion of the coil due to the magnetic field generated in the positive pole portion of the magnetic member. Since the negative pole portion of the magnetic member is faced with the second side portion of the coil, when the current is applied to the second side portion of the coil, the force is generated in the second side portion of the coil due to the magnetic field generated in the negative pole portion of the magnetic member. The current is applied to the first side portion of the coil faced with the positive pole portion of the magnetic member and the current is applied to the second side portion of the coil faced with the negative pole portion of the magnetic member, and since the force resulting from the magnetic field generated in the first side portion of the coil is combined with the force resulting from the magnetic field generated in the second side portion of the coil on this occasion, the drive assembly including the coil is turned.

In the laser radar driving apparatus according to the present embodiment, the drive assembly is configured substantially laterally symmetrically when viewed from the front.

Therefore, the drive assembly is turned, for example, substantially in the lateral turn direction in a well-balanced manner. For example, in the case of the laser radar driving apparatus where the laser beam drive characteristics in the lateral turn direction is regarded as important, it is determined that a laser radar driving apparatus with excellent laser beam drive characteristics in the lateral turn direction has higher performance than one with excellent laser beam drive characteristics in the longitudinal turn direction. Since the drive assembly is substantially laterally symmetrically configured, for example, when the drive assembly is moved substantially in the lateral turn direction, the drive assembly is smoothly turned in either of the left turn direction or the right turn direction.

In the laser radar driving apparatus according to the present embodiment, the drive assembly is moved substantially in the pan direction defined as the lateral turn direction.

Therefore, the drive assembly of the laser radar driving apparatus is quickly moved substantially in the pan direction defined as the lateral turn direction.

The laser radar driving apparatus, according to the present invention, applying a laser beam to a target object and detecting the laser beam reflected and returned from the target object to measure a distance to the target object, at least comprises: an optical member that the laser beam is applied to; a first-direction drive main body member that the optical member is mounted to; a first-direction drive coil capable of manipulating the first-direction drive main body member substantially in a first direction; a second-direction drive main body member that the first-direction drive main body member is rotatably assembled to; and a second-direction drive coil capable of manipulating the second-direction drive main body member substantially in a second direction, wherein a first-direction drive assembly is configured with mounting the optical member and the first-direction drive coil to the first-direction drive main body member, wherein a second-direction drive assembly is configured with mounting the second-direction drive coil to the second-direction drive main body member, and wherein the first-direction drive assembly is rotatably assembled to the second-direction drive assembly.

Therefore, the response characteristics of the laser radar driving apparatus are easily improved. Since the first-direction drive assembly including the optical member, the first-direction drive main body member, and the first-direction drive coil is rotatably assembled to the second-direction drive assembly including the second-direction drive main body member and the second-direction drive coil, the first-direction drive assembly is easily turned relative to the second-direction drive assembly. Since the first-direction drive assembly rotatable substantially in the first direction is rotatably assembled to the second-direction drive assembly rotatable substantially in the second direction, the turning ability of the first-direction drive assembly relative to the second-direction drive assembly is improved. Therefore, there can be provided the laser radar driving apparatus with the improved response characteristics.

In the laser radar driving apparatus according to the present invention, the second-direction drive main body member includes a housing unit corresponding to the first-direction drive assembly, and the first-direction drive assembly is rotatably mounted to the housing unit.

Therefore, the first-direction drive assembly is freely turned substantially in the first direction in the housing unit of the second-direction drive main body member making up the second-direction drive assembly without other objects blocking the movement thereof. The first-direction drive assembly disposed in the housing unit of the second-direction drive main body member making up the second-direction drive assembly is freely turned substantially in the first direction without interference from other objects.

The laser radar driving apparatus according to the present invention comprises a frame yoke capable of holding the second-direction drive assembly, wherein the second-direction drive assembly is rotatably assembled to the frame yoke.

Therefore, the response characteristics of the laser radar driving apparatus are easily improved. Since the second-direction drive assembly rotatably provided for the first-direction drive assembly is rotatably assembled to the frame yoke capable of holding the second-direction drive assembly, the second-direction drive assembly including the first-direction drive assembly is easily turned relative to the frame yoke. Since the second-direction drive assembly capable of turning substantially in the second direction is rotatably assembled to the frame yoke, the turning ability of the second-direction drive assembly relative to the frame yoke is improved. Therefore, there can be provided the laser radar driving apparatus with the improved response characteristics.

In the laser radar driving apparatus according to the present invention, the frame yoke includes a housing unit corresponding to the second-direction drive assembly, and the second-direction drive assembly is rotatably mounted to the housing unit.

Therefore, the second-direction drive assembly is freely turned substantially in the second direction in the housing unit of the frame yoke without other objects blocking the movement thereof. The second-direction drive assembly disposed in the housing unit of the frame yoke is freely turned substantially in the second direction without interference from other objects.

The laser radar driving apparatus according to the present invention comprises: a first-direction drive magnetic member corresponding to the first-direction drive coil; a second-direction drive magnetic member corresponding to the second-direction drive coil; and a frame yoke that the first-direction drive magnetic member and the second-direction drive magnetic member are fixed to, wherein when the second-direction drive assembly including the first-direction drive assembly is rotatably assembled to the frame yoke, the first-direction drive coil is substantially positioned in an effective magnetic field of the first-direction drive magnetic member, and the second-direction drive coil is substantially positioned in an effective magnetic field of the second-direction drive magnetic member.

Therefore, the response characteristics of the laser radar driving apparatus are improved. When second-direction drive assembly including the first-direction drive assembly is rotatably assembled to the frame yoke having the first-direction drive magnetic members and the second-direction drive magnetic members fixed thereto, the first-direction drive coil is substantially positioned in the effective magnetic fields of the first-direction drive magnetic members and, therefore, when the current is applied to the first-direction drive coil corresponding to the first-direction drive magnetic members, the first-direction drive assembly included in the second-direction drive assembly is quickly turned substantially in the first direction by the electromagnetic forces generated in the first-direction drive coil. When second-direction drive assembly including the first-direction drive assembly is rotatably assembled to the frame yoke having the first-direction drive magnetic members and the second-direction drive magnetic members fixed thereto, the second-direction drive coil is substantially positioned in the effective magnetic fields of the second-direction drive magnetic members and, therefore, when the current is applied to the second-direction drive coil corresponding to the second-direction drive magnetic members, the second-direction drive assembly including the first-direction drive assembly is quickly turned substantially in the second direction by the electromagnetic forces generated in the second-direction drive coil. Since the first-direction drive assembly or the second-direction drive assembly is quickly turned, the response characteristics of the laser radar driving apparatus are improved.

In the laser radar driving apparatus according to the present invention, the frame yoke includes a housing unit that the first-direction drive magnetic member and the second-direction drive magnetic member are mounted to, corresponding to the second-direction drive assembly, and the second-direction drive assembly is rotatably mounted to the housing unit.

Therefore, the second-direction drive assembly is freely turned, without other objects blocking the movement thereof, substantially in the second direction in the housing unit of the frame yoke having the first-direction drive magnetic members and the second-direction drive magnetic members disposed thereon. Even if the first-direction drive magnetic members and the second-direction drive magnetic members are disposed in the housing unit of the frame yoke, the second-direction drive assembly disposed in the housing unit of the frame yoke is freely turned substantially in the second direction without interference from other objects.

The laser radar driving apparatus according to the present invention comprises: a substantially flat-plate first-direction drive magnetic member corresponding to the first-direction drive coil; and a substantially flat-plate second-direction drive magnetic member corresponding to the second-direction drive coil, wherein the first-direction drive coil is configured as a substantially annular flat-plate coil, wherein the second-direction drive coil is configured as a substantially annular cylindrical coil, wherein the first-direction drive magnetic member is mounted to be faced with one surface portion of the first-direction drive coil, and wherein the second-direction drive magnetic member is mounted to be faced with a side surface portion of the second-direction drive coil.

Therefore, the response characteristics of the laser radar driving apparatus are improved. Since the substantially flat-plate first-direction drive magnetic members are disposed to be faced with the one surface portion of the first-direction drive coil, when the current is applied to the first-direction drive coil, the forces are generated in the first-direction drive coil due to the magnetic force lines generated in the substantially flat-plate first-direction drive magnetic members. The current is applied to the first-direction drive coil faced with the substantially flat-plate first-direction drive magnetic member, and by the electromagnetic force generated on this occasion in the first-direction drive coil the first-direction drive assembly including the first-direction drive coil is turned. Since the substantially flat-plate second-direction drive magnetic members are disposed to be faced with the side surface portion of the second-direction drive coil, when the current is applied to the second-direction drive coil, the forces are generated in the second-direction drive coil due to the magnetic force lines generated in the substantially flat-plate second-direction drive magnetic members. The current is applied to the second-direction drive coil faced with the substantially flat-plate second-direction drive magnetic member, and by the electromagnetic force generated on this occasion in the second-direction drive coil the second-direction drive assembly including the second-direction drive coil is turned.

The laser radar driving apparatus according to the present invention comprises a first-direction drive magnetic member corresponding to the first-direction drive coil, wherein a plurality of the first-direction drive magnetic members are disposed for the one first-direction drive coil, wherein each of the first-direction drive magnetic members is formed in a substantially flat-plate shape, including a substantially flat positive pole portion, and a substantially flat negative pole portion which is opposite in polarity to the substantially flat positive pole portion, wherein the first-direction drive coil is formed in a substantially annular flat-plate shape, including a substantially flat first side portion corresponding to a substantially flat positive pole portion of a first first-direction drive magnetic member, and a substantially flat second side portion which is opposite to the substantially flat first side portion, corresponding to a substantially flat negative pole portion of a second first-direction drive magnetic member, wherein the substantially flat positive pole portion of the first first-direction drive magnetic member is faced with the substantially flat first side portion of the first-direction drive coil, and wherein the substantially flat negative pole portion of the second first-direction drive magnetic member is faced with the substantially flat second side portion of the first-direction drive coil, and the laser radar driving apparatus further comprises a second-direction drive magnetic member corresponding to the second-direction drive coil, wherein a plurality of the second-direction drive magnetic members are disposed for the one second-direction drive coil, wherein each of the second-direction drive magnetic members is formed in a substantially flat-plate shape, including a substantially flat positive pole portion, and a substantially flat negative pole portion which is opposite in polarity to the substantially flat positive pole portion, wherein the second-direction drive coil is formed in a substantially annular cylindrical shape, including a substantially flat-plate first side portion corresponding to a substantially flat positive pole portion of a first second-direction drive magnetic member and corresponding to a substantially flat negative pole portion of a second second-direction drive magnetic member, and a substantially flat-plate second side portion which is opposite to the substantially flat-plate first side portion, corresponding to a substantially flat positive pole portion of a third second-direction drive magnetic member and corresponding to a substantially flat negative pole portion of a fourth second-direction drive magnetic member, wherein the substantially flat positive pole portion of the first second-direction drive magnetic member is faced with the substantially flat-plate first side portion of the second-direction drive coil, wherein the substantially flat negative pole portion of the second second-direction drive magnetic member is faced with the substantially flat-plate first side portion of the second-direction drive coil, wherein the substantially flat positive pole portion of the third second-direction drive magnetic member is faced with the substantially flat-plate second side portion of the second-direction drive coil, and wherein the substantially flat negative pole portion of the fourth second-direction drive magnetic member is faced with the substantially flat-plate second side portion of the second-direction drive coil.

Therefore, the response characteristics of the laser radar driving apparatus are improved. Since the substantially flat positive pole portion of the first substantially flat-plate first-direction drive magnetic member is faced with the substantially flat first side portion of the substantially annular flat-plate first-direction drive coil, when the current is applied to the substantially flat first side portion of the substantially annular flat-plate first-direction drive coil, the force is generated in the substantially flat first side portion of the substantially annular flat-plate first-direction drive coil due to the magnetic force line generated in the substantially flat positive pole portion of the first substantially flat-plate first-direction drive magnetic member. Since the substantially flat negative pole portion of the second substantially flat-plate first-direction drive magnetic member is faced with the substantially flat second side portion of the substantially annular flat-plate first-direction drive coil, when the current is applied to the substantially flat second side portion of the substantially annular flat-plate first-direction drive coil, the force is generated in the substantially flat second side portion of the substantially annular flat-plate first-direction drive coil due to the magnetic force line generated in the substantially flat negative pole portion of the second substantially flat-plate first-direction drive magnetic member. The current is applied to the substantially flat first side portion of the substantially annular flat-plate first-direction drive coil faced with the substantially flat positive pole portion of the first substantially flat-plate first-direction drive magnetic member, and the current is applied to the substantially flat second side portion of the substantially annular flat-plate first-direction drive coil faced with the substantially flat negative pole portion of the second substantially flat-plate first-direction drive magnetic member, and on this occasion, since the force resulting from the magnetic field generated in the substantially flat first side portion of the substantially annular flat-plate first-direction drive coil is combined with the force resulting from the magnetic field generated in the substantially flat second side portion of the substantially annular flat-plate first-direction drive coil, the first-direction drive assembly including the substantially annular flat-plate first-direction drive coil is turned. Since the substantially flat positive pole portion of the first substantially flat-plate second-direction drive magnetic member is faced with the substantially flat first side portion of the substantially annular cylindrical second-direction drive coil, when the current is applied to the substantially flat first side portion of the substantially annular cylindrical second-direction drive coil, the force is generated in the substantially flat first side portion of the substantially annular cylindrical second-direction drive coil due to the magnetic force line generated in the substantially flat positive pole portion of the first substantially flat-plate second-direction drive magnetic member. Since the substantially flat negative pole portion of the second substantially flat-plate second-direction drive magnetic member is faced with the substantially flat first side portion of the substantially annular cylindrical second-direction drive coil, when the current is applied to the substantially flat first side portion of the substantially annular cylindrical second-direction drive coil, the force is generated in the substantially flat first side portion of the substantially annular cylindrical second-direction drive coil due to the magnetic force line generated in the substantially flat negative pole portion of the second substantially flat-plate second-direction drive magnetic member. Since the substantially flat positive pole portion of the third substantially flat-plate second-direction drive magnetic member is faced with the substantially flat-plate second side portion of the substantially annular cylindrical second-direction drive coil, when the current is applied to the substantially flat second side portion of the substantially annular cylindrical second-direction drive coil, the force is generated in the substantially flat second side portion of the substantially annular cylindrical second-direction drive coil due to the magnetic force line generated in the substantially flat positive pole portion of the third substantially flat-plate second-direction drive magnetic member. Since the substantially flat negative pole portion of the fourth substantially flat-plate second-direction drive magnetic member is faced with the substantially flat-plate second side portion of the substantially annular cylindrical second-direction drive coil, when the current is applied to the substantially flat second side portion of the substantially annular cylindrical second-direction drive coil, the force is generated in the substantially flat second side portion of the substantially annular cylindrical second-direction drive coil due to the magnetic force line generated in the substantially flat negative pole portion of the fourth substantially flat-plate second-direction drive magnetic member. The current is applied to the substantially flat first side portion of the substantially annular cylindrical second-direction drive coil faced with the substantially flat positive pole portion of the first substantially flat-plate second-direction drive magnetic member and is also applied to the substantially flat first side portion of the substantially annular cylindrical second-direction drive coil faced with the substantially flat negative pole portion of the second substantially flat-plate second-direction drive magnetic member; the current is applied to the substantially flat second side portion of the substantially annular cylindrical second-direction drive coil faced with the substantially flat positive pole portion of the third substantially flat-plate second-direction drive magnetic member and is also applied to the substantially flat second side portion of the substantially annular cylindrical second-direction drive coil faced with the substantially flat negative pole portion of the fourth substantially flat-plate second-direction drive magnetic member; and since the force resulting from the magnetic field generated in the substantially flat first side portion of the substantially annular cylindrical second-direction drive coil is combined, on this occasion, with the force resulting from the magnetic field generated in the substantially flat second side portion of the substantially annular cylindrical second-direction drive coil, the second-direction drive assembly including the substantially annular cylindrical second-direction drive coil is turned.

In the laser radar driving apparatus according to the present invention, the first-direction drive main body member includes a first-direction drive turning shaft capable of turning the first-direction drive assembly, and the second-direction drive main body member includes a first shaft supporting portion corresponding to the first-direction drive turning shaft.

Therefore, the response characteristics of the laser radar driving apparatus are improved when the first-direction drive assembly is turned substantially in the first direction. Since the first shaft supporting portion of the second-direction drive main body member is combined with the first-direction drive turning shaft capable of turning the first-direction drive assembly, the first-direction drive assembly including the optical member, the first-direction drive coil, and the first-direction drive main body member is certainly turned around the first-direction drive turning shaft of the first-direction drive main body member substantially in the first direction.

In the laser radar driving apparatus according to the present invention, the first-direction drive turning shaft is provided with the positioning portions that prevent the position of the first-direction drive assembly from being displaced relative to the second-direction drive main body member substantially in the axial direction of the first-direction drive turning shaft.

Therefore, the first-direction drive assembly is certainly turned substantially in the first direction. Since the first-direction drive turning shaft is provided with the positioning portions that prevent the position of the first-direction drive assembly from being displaced from the second-direction drive main body member substantially in the axial direction of the first-direction drive turning shaft, when the first-direction drive assembly is turned relative to the second-direction drive assembly, the displacement of the first-direction drive assembly relative to the second-direction drive assembly does not occur and the first-direction drive assembly is accurately turned substantially in the first direction relative to the second-direction drive assembly.

In the laser radar driving apparatus according to the present invention, the first-direction drive main body member includes a first-direction drive turning shaft capable of turning the first-direction drive assembly, and a gravity center portion of the first-direction drive assembly substantially coincides with a center portion on a center axis of the first-direction drive turning shaft.

Therefore, the response characteristics of the laser radar driving apparatus are improved when the first-direction drive assembly is turned substantially in the first direction. Since the gravity center portion of the first-direction drive assembly configured with mounting the optical member and the first-direction drive coil on the first-direction drive main body member substantially coincides with the center portion on the center axis of the first-direction drive turning shaft of the first-direction drive main body member capable of turning the first-direction drive assembly, the first-direction drive assembly including the optical member, the first-direction drive coil, and the first-direction drive main body member is smoothly turned around the first-direction drive turning shaft of the first-direction drive main body member substantially in the first direction.

The laser radar driving apparatus according to the present invention comprises a frame yoke capable of holding the second-direction drive assembly, wherein the second-direction drive main body member includes a second-direction drive turning shaft capable of turning the second-direction drive assembly, and wherein the frame yoke includes a second shaft supporting portion corresponding to the second-direction drive turning shaft.

Therefore, the response characteristics of the laser radar driving apparatus are easily improved when the second-direction drive assembly is turned substantially in the second direction. Since the second-direction drive turning shaft capable of turning the second-direction drive assembly is assembled to the second shaft supporting portion of the frame yoke, the second-direction drive assembly to which the first-direction drive assembly is rotatably assembled is certainly and easily turned around the second-direction drive turning shaft of the second-direction drive main body member substantially in the second direction.

In the laser radar driving apparatus according to the present invention, the second-direction turning shaft is provided with the positioning portions that prevent the position of the second-direction drive assembly from being displaced relative to the frame yoke substantially in the axial direction of the second-direction drive turning shaft.

Therefore, the second-direction drive assembly is certainly turned substantially in the second direction. Since the second-direction turning shaft is provided with the positioning portions that prevent the position of the second-direction drive assembly from being displaced from the frame yoke substantially in the axial direction of the second-direction drive turning shaft, when the second-direction drive assembly is turned relative to the frame yoke, the displacement of the second-direction drive assembly relative to the frame yoke does not occur and the second-direction drive assembly is accurately turned substantially in the second direction relative to the frame yoke.

In the laser radar driving apparatus according to the present invention, the second-direction drive main body member includes a second-direction drive turning shaft capable of turning the second-direction drive assembly, wherein a two-direction drive assembly is configured with assembling the first-direction drive assembly rotatably to the second-direction drive assembly, and wherein a gravity center portion of the two-direction drive assembly substantially coincides with a center portion on a center axis of the second-direction drive turning shaft.

Therefore, the response characteristics of the laser radar driving apparatus are easily improved when the second-direction drive assembly is turned substantially in the second direction. The two-direction drive assembly is configured by rotatably assembling the first-direction drive assembly configured with mounting the optical member and the first-direction drive coil on the first-direction drive main body member to the second-direction drive assembly configured with mounting the second-direction drive coil on the second-direction drive main body member. Since the gravity center portion of the second-direction drive assembly substantially coincides with the center portion on the center axis of the second-direction drive turning shaft of the second-direction drive main body member capable of turning the second-direction drive assembly, the two-direction drive assembly including the first-direction drive assembly and the second-direction drive assembly becomes easy to be turned smoothly around the second-direction drive turning shaft of the second-direction drive main body member substantially in the second direction.

In the laser radar driving apparatus according to the present invention, when the first direction is defined as the lateral turn direction and the second direction is defined as the longitudinal turn direction, the first-direction drive assembly is made lighter in weight than the second-direction drive assembly.

Therefore, the response characteristics substantially in the lateral turn direction of the first-direction drive assembly of the laser radar driving apparatus are improved. For example, in the case of the laser radar driving apparatus where the laser beam drive characteristics in the first direction defined as the lateral turn direction is regarded as important, it is determined that a laser radar driving apparatus having excellent laser beam drive characteristics in the first direction defined as the lateral turn direction has higher performance than one having excellent laser beam drive characteristics in the second direction defined as the longitudinal turn direction. Since the first-direction drive assembly is lighter in weight than the second-direction drive assembly, the first-direction drive assembly at the time of turning the first-direction drive assembly becomes smaller in moment than the second-direction drive assembly at the time of turning the second-direction drive assembly, and the first-direction drive assembly is easily turned. Therefore, there is configured the laser radar driving apparatus with the improved response characteristics in the lateral turn direction.

In the laser radar driving apparatus according to the present invention, when the first direction is defined as the lateral turn direction and the second direction is defined as the longitudinal turn direction, the first-direction drive assembly is made smaller in size than the second-direction drive assembly.

Therefore, the response characteristics substantially in the lateral turn direction of the first-direction drive assembly of the laser radar driving apparatus are improved. In accordance with the design/specification of the laser radar driving apparatus, for example, there are some laser radar driving apparatuses, where the laser beam drive characteristics in the first direction defined as the lateral turn direction is regarded as important. In the case of such a laser radar driving apparatus as above, it is determined that one having excellent laser beam drive characteristics in the first direction defined as the lateral turn direction has higher performance than one having excellent laser beam drive characteristics in the second direction defined as the longitudinal turn direction. Since the first-direction drive assembly is configured to be smaller in size than the second-direction drive assembly, the first-direction drive assembly at the time of turning the first-direction drive assembly becomes smaller in moment than the second-direction drive assembly at the time of turning the second-direction drive assembly, and the first-direction drive assembly becomes easily turned. Therefore, there is configured the laser radar driving apparatus with the improved response characteristics in the lateral turn direction.

In the laser radar driving apparatus according to the present invention, if the first direction is defined as the lateral turn direction, the first-direction drive assembly is configured substantially laterally symmetrically when viewed from the front.

Therefore, the first-direction drive assembly is turned substantially in the lateral turn direction in a well-balanced manner. Since the first-direction drive assembly is substantially laterally symmetrically configured in the front view, when the first-direction drive assembly is moved substantially in the lateral turn direction, the first-direction drive assembly is smoothly turned in either of the left turn direction or the right turn direction.

In the laser radar driving apparatus according to the present invention, if the second direction is defined as the longitudinal turn direction, the first-direction drive assembly is configured substantially longitudinally symmetrically when viewed from the front.

Therefore, the second-direction drive assembly, to which the first-direction drive assembly rotatably is assembled, is turned substantially in the longitudinal turn direction in a well-balanced manner. Since the first-direction drive assembly assembled to the second-direction drive assembly is substantially longitudinally symmetrically configured in the front view, when the second-direction drive assembly including the first-direction drive assembly is moved substantially in the longitudinal turn direction, the second-direction drive assembly including the first-direction drive assembly is smoothly turned in either of the upward turn direction or the downward turn direction.

In the laser radar driving apparatus according to the present invention, if the second direction is defined as the longitudinal turn direction, the second-direction drive assembly is configured substantially longitudinally symmetrically when viewed from the front.

Therefore, the second-direction drive assembly is turned substantially in the longitudinal turn direction in a well-balanced manner. Since the second-direction drive assembly is substantially longitudinally symmetrically configured in the front view, when the second-direction drive assembly is moved substantially in the longitudinal turn direction, the second-direction drive assembly is smoothly turned in either of the upward turn direction or the downward turn direction.

In the laser radar driving apparatus according to the present invention, if the first direction is defined as the lateral turn direction and the second direction is defined as the longitudinal turn direction, a two-direction drive assembly is configured with assembling the first-direction drive assembly rotatably to the second-direction drive assembly, and the two-direction drive assembly is configured substantially laterally symmetrically and is configured substantially longitudinally symmetrically, when viewed from the front.

Therefore, the first-direction drive assembly making up the two-direction drive assembly is turned substantially in the lateral turn direction in a well-balanced manner. The two-direction drive assembly configured by rotatably assembling the first-direction drive assembly to the second-direction drive assembly is turned substantially in the longitudinal turn direction in a well-balanced manner. The first-direction drive assembly is substantially laterally symmetrically configured in the front view and also substantially longitudinally symmetrically configured in the front view. As is the case with the first-direction drive assembly, the second-direction drive assembly is substantially laterally symmetrically configured in the front view and also substantially longitudinally symmetrically configured in the front view. Since the first-direction drive assembly configured substantially laterally symmetrically in the front view as well as substantially longitudinally symmetrically in the front view is rotatably assembled to the second-direction drive assembly configured substantially laterally symmetrically in the front view as well as substantially longitudinally symmetrically in the front view, the two-direction drive assembly including the first-direction drive assembly and the second-direction drive assembly is substantially laterally symmetrically configured in the front view and also substantially longitudinally symmetrically configured in the front view. Since the two-direction drive assembly is substantially laterally symmetrically configured in the front view and also substantially longitudinally symmetrically configured in the front view, when the first-direction drive assembly rotatably assembled to the second-direction drive assembly making up the two-direction drive assembly is moved substantially in the lateral turn direction, the first-direction drive assembly making up the two-direction drive assembly is smoothly turned in either of the left turn direction or the right turn direction. Since the two-direction drive assembly is substantially laterally symmetrically configured in the front view as well as substantially longitudinally symmetrically configured in the front view, when the two-direction drive assembly configured by rotatably assembling the first-direction drive assembly to the second-direction drive assembly is moved substantially in the longitudinal turn direction, the two-direction drive assembly including the first-direction drive assembly and the second-direction drive assembly is smoothly turned in either of the upward turn direction or the downward turn direction.

In the laser radar driving apparatus according to the present invention, the first direction is defined as the pan direction when the first-direction drive assembly is moved substantially in the lateral direction, and the second direction is defined as the tilt direction when the second-direction drive assembly is moved substantially in the longitudinal direction.

Therefore, first-direction drive assembly of the laser radar driving apparatus is quickly moved substantially in the pan direction defined as the lateral turn direction. The second-direction drive assembly including the first-direction drive assembly of the laser radar driving apparatus is quickly moved substantially in the tilt direction defined as the longitudinal turn direction.

In the laser radar driving apparatus according to the present invention, the material containing light metals is used to form the coils.

Therefore, the response characteristics of the laser radar driving apparatus are improved. The material containing light metal has a specific gravity smaller than, for example, other metal materials and is suitable for weight reduction. If the material containing light metals is used to form the coils, the weights of the coils can be reduced. Since the material containing light metals is used to form the coils, the weights of the drive assemblies including the coils can be reduced and, as a result, the drive assemblies are easily moved. Since the drive assemblies are easily moved, the response characteristics of the laser radar driving apparatus including the drive assemblies are improved.

In the laser radar driving apparatus according to the present invention, the resin material is used to form the main body members.

Therefore, the response characteristics of the laser radar driving apparatus are improved. The resin material has a specific gravity smaller than, for example, metal material and is considered to be suitable for weight reduction. If the resin material is used to form the main body members, the weights of the main body members can be reduced. Since the resin material is used to form the main body members, the weights of the drive assemblies including the main body members can be reduced and, as a result, the drive assemblies are easily moved. Since the drive assemblies have reduced in weight and are easily moved, the response characteristics of the laser radar driving apparatus including the drive assemblies are improved.

In the laser radar driving apparatus according to the present invention, the resin material is used to form the optical member.

Therefore, the response characteristics of the laser radar driving apparatus are improved. The resin material has a specific gravity smaller than, for example, metal material and is suitable for weight reduction. If the resin material is used to form the optical member, the weight of the optical member can be reduced. Since the resin material is used to form the optical member, the weight of the drive assembly including the optical member can be reduced and, as a result, the drive assembly is easily moved. Since the drive assembly has a reduced weight and is easily moved, the response characteristics of the laser radar driving apparatus including the drive assembly are improved.

In the laser radar driving apparatus according to the present invention, there is used the mirror which reflects the laser beam emitted from the light emitting element.

Therefore, the response characteristics of the mirror of the laser radar driving apparatus are easily improved. When the mirror is turned, the emission angle of the laser beam is substantially doubled and the wobbling angle of the mirror is reduced. The laser beam emitted from the light emitting element is reflected by the mirror to be applied to a target object. The laser beam reflected and returned from the target object is detected by the laser radar to measure a distance between the laser radar and the target object.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A laser radar driving apparatus comprising:
   a first assembly including:
   an optical member configured to reflect a laser beam,
   a first main body member mounted with the optical member,
   a first turning shaft turnable in a first direction, and
   a first coil configured to turn the first main body member in the first direction along with the first turning shaft;
   a second assembly including:
   a second main body member including a first shaft supporting portion configured to pivotally support the first turning shaft, and a housing unit configured to house the first assembly rotatably in the first direction,
   a second turning shaft turnable in a second direction, and
   a second coil configured to turn the second main body member in the second direction along with the second turning shaft;
   a first magnetic member facing the first coil;
   a second magnetic member facing the second coil; and
   a frame yoke in a shape of rectangle box including a second shaft supporting portion configured to pivotally support the second turning shaft, the frame yoke being disposed with the second assembly mounted with the first assembly, the first magnetic member, and the second magnetic member.

2. The laser radar driving apparatus of claim 1,
   wherein the first magnetic member comprises a substantially flat-plate magnetic member corresponding to the first coil,
   wherein the first coil is configured as a substantially annular flat-plate coil, and
   wherein the substantially flat-plate magnetic member is positioned on a side of one surface portion of the substantially annular flat-plate coil.

3. The laser radar driving apparatus of claim 1,
   wherein the first magnetic member is disposed for the first coil,
   wherein the first magnetic member is formed in a substantially flat-plate shape, including a positive pole portion and a negative pole portion which is opposite in polarity to the positive pole portion,
   wherein the first coil is formed in a substantially annular flat-plate shape, including a first side portion corresponding to the positive pole portion and a second side portion, which is opposite to the first side portion, corresponding to the negative pole portion, wherein the positive pole portion is faced with the first side portion, and wherein the negative pole portion is faced with the second side portion.

4. The laser radar driving apparatus of claim 1, wherein the first assembly is configured substantially laterally symmetrically when viewed from the front.

5. A laser radar driving apparatus applying a laser beam to a target object and detecting the laser beam reflected and returned from the target object to measure a distance to the target object, at least comprising:
   an optical member that the laser beam is applied to;
   a first-direction drive main body member that the optical member is mounted to;
   a first-direction drive coil capable of manipulating the first-direction drive main body member substantially in a first direction;
   a second-direction drive main body member that the first-direction drive main body member is rotatably assembled to; and
   a second-direction drive coil capable of manipulating the second-direction drive main body member substantially in a second direction,
   a first-direction drive assembly being configured with mounting the optical member and the first-direction drive coil to the first-direction drive main body member,
   a second-direction drive assembly being configured with mounting the second-direction drive coil to the second-direction drive main body member,
   the first-direction drive assembly being rotatably assembled to the second-direction drive assembly; and
   a first-direction drive magnetic member corresponding to the first-direction drive coil,
   wherein a plurality of the first-direction drive magnetic members are disposed for the one first-direction drive coil,
   wherein each of the first-direction drive magnetic members is formed in a substantially flat-plate shape, including a substantially flat positive pole portion, and a substantially flat negative pole portion which is opposite in polarity to the substantially flat positive pole portion,
   wherein the first-direction drive coil is formed in a substantially annular flat-plate shape, including a substantially flat first side portion corresponding to a substantially flat positive pole portion of a first first-direction drive magnetic member, and a substantially flat second side portion which is opposite to the substantially flat first side portion, corresponding to a substantially flat negative pole portion of a second first-direction drive magnetic member,
   wherein the substantially flat positive pole portion of the first first-direction drive magnetic member is faced with the substantially flat first side portion of the first-direction drive coil and
   wherein the substantially flat negative pole portion of the second first-direction drive magnetic member is faced with the substantially flat second side portion of the first-direction drive coil,
   the laser radar driving apparatus further comprising a second-direction drive magnetic member corresponding to the second-direction drive coil,
   wherein a plurality of the second-direction drive magnetic members are disposed for the one second-direction drive coil,
   wherein each of the second-direction drive magnetic members is formed in a substantially flat-plate shape, including a substantially flat positive pole portion, and a substantially flat negative pole portion which is opposite in polarity to the substantially flat positive pole portion,
   wherein the second-direction drive coil is formed in a substantially annular cylindrical shape, including
   a substantially flat-plate first side portion corresponding to a substantially flat positive pole portion of a first second-direction drive magnetic member and corresponding to a substantially flat negative pole portion of a second second-direction drive magnetic member, and
   a substantially flat-plate second side portion which is opposite to the substantially flat-plate first side portion, corresponding to a substantially flat positive pole portion of a third second-direction drive magnetic member and corresponding to a substantially flat negative pole portion of a fourth second-direction drive magnetic member, wherein the substantially flat positive pole portion of the first second-direction drive magnetic member is faced with the substantially flat-plate first side portion of the second-direction drive coil, wherein the substantially flat negative pole portion of the second second-direction drive magnetic member is faced with the substantially flat-plate first side portion of the second-direction drive coil, wherein the substantially flat positive pole portion of the third second-direction drive magnetic member is faced with the substantially flat-plate second side portion of the second-direction drive coil, and wherein the substantially flat negative pole portion of the fourth second-direction drive magnetic member is faced with the substantially flat-plate second side portion of the second-direction drive coil.

6. The laser radar driving apparatus of claim 5,
wherein the first-direction drive main body member includes a first-direction drive turning shaft capable of turning the first-direction drive assembly, and
wherein the second-direction drive main body member includes a first shaft supporting portion corresponding to the first-direction drive turning shaft.

7. The laser radar driving apparatus of claim 5,
wherein the first-direction drive main body member includes a first-direction drive turning shaft capable of turning the first-direction drive assembly, and
wherein a gravity center portion of the first-direction drive assembly substantially coincides with a center portion on a center axis of the first-direction drive turning shaft.

8. The laser radar driving apparatus of claim 5, further comprising
a frame yoke capable of holding the second-direction drive assembly,
wherein the second-direction drive main body member includes a second-direction drive turning shaft capable of turning the second-direction drive assembly, and
wherein the frame yoke includes a second shaft supporting portion corresponding to the second-direction drive turning shaft.

9. The laser radar driving apparatus of claim 5,
wherein the second-direction drive main body member includes a second-direction drive turning shaft capable of turning the second-direction drive assembly, wherein a two-direction drive assembly is configured with assembling the first-direction drive assembly rotatably to the second-direction drive assembly, and
wherein a gravity center portion of the two-direction drive assembly substantially coincides with a center portion on a center axis of the second-direction drive turning shaft.

10. The laser radar driving apparatus of claim 5, wherein when the first direction is defined as the lateral turn direction and the second direction is defined as the longitudinal turn direction, the first-direction drive assembly is made lighter in weight than the second-direction drive assembly.

11. The laser radar driving apparatus of claim 5, wherein when the first direction is defined as the lateral turn direction and the second direction is defined as the longitudinal turn direction, the first-direction drive assembly is made smaller in size than the second-direction drive assembly.

12. The laser radar driving apparatus of claim 5, wherein if the first direction is defined as the lateral turn direction, the first-direction drive assembly is configured substantially laterally symmetrically when viewed from the front.

13. The laser radar driving apparatus of claim 5, wherein if the second direction is defined as the longitudinal turn direction, the first-direction drive assembly is configured substantially longitudinally symmetrically when viewed from the front.

14. The laser radar driving apparatus of claim 5, wherein if the second direction is defined as the longitudinal turn direction, the second-direction drive assembly is configured substantially longitudinally symmetrically when viewed from the front.

15. The laser radar driving apparatus of claim 5, wherein if the first direction is defined as the lateral turn direction and the second direction is defined as the longitudinal turn direction,
a two-direction drive assembly is configured with assembling the first-direction drive assembly rotatably to the second-direction drive assembly, and
the two-direction drive assembly is configured substantially laterally symmetrically and is configured substantially longitudinally symmetrically, when viewed from the front.

* * * * *

UNITED STATES PATENT AND TRADEMARK OFFICE
CERTIFICATE OF CORRECTION

| | | |
|---|---|---|
| PATENT NO. | : 7,663,736 B2 | Page 1 of 1 |
| APPLICATION NO. | : 11/852871 | |
| DATED | : February 16, 2010 | |
| INVENTOR(S) | : Noboru Onojima | |

It is certified that error appears in the above-identified patent and that said Letters Patent is hereby corrected as shown below:

Claim 5, Column 58, Line 37, delete "coil" and insert --coil,--, therefor.

Signed and Sealed this
Thirteenth Day of December, 2011

David J. Kappos
*Director of the United States Patent and Trademark Office*